United States Patent [19]
Joffre et al.

[11] Patent Number: 5,840,800
[45] Date of Patent: Nov. 24, 1998

[54] CROSSLINKED EMULSIONS OF PRE-FORMED SILICON MODIFIED ORGANIC POLYMERS

[75] Inventors: Eric Jude Joffre; Arthur James Tselepis; Andreas Thomas Franz Wolf, all of Midland, Mich.

[73] Assignee: Dow Corning Corporation, Midland, Mich.

[21] Appl. No.: 552,162

[22] Filed: Nov. 2, 1995

[51] Int. Cl.$^6$ ........................................ C08L 43/04
[52] U.S. Cl. ................ 524/806; 524/834; 525/100; 525/103; 525/104; 525/105; 525/106; 525/474; 525/537
[58] Field of Search ..................... 524/837, 806; 525/100, 103, 104, 105, 106, 474, 537

[56] References Cited

U.S. PATENT DOCUMENTS 4,273,634  6/1981  Saam et al. ............................. 525/477
5,482,994  1/1996  Liles et al. ............................. 524/806

FOREIGN PATENT DOCUMENTS 59-6219  1/1984  Japan .

*Primary Examiner*—Melvyn I. Marquis
*Attorney, Agent, or Firm*—Richard I. Gearhart

[57] ABSTRACT

A crosslinked polymer dispersion comprising a preformed polymer, selected from the group consisting of silicon modified organic polymers, mixtures of silicon modified organic polymers, mixtures of silicon modified organic polymer(s) with regular organic polymers, mixtures of silicon modified organic polymer(s) with siloxane polymers, mixtures of above polymers, and mixtures of above polymer(s) with organic plasticizers or solvents.

37 Claims, No Drawings

CROSSLINKED EMULSIONS OF PRE-FORMED SILICON MODIFIED ORGANIC POLYMERS

FIELD OF THE INVENTION

This invention relates to an aqueous dispersion of crosslinked pre-formed silicon modified organic polymer which, upon drying, yields an elastomer.

BACKGROUND OF SILOXANE COPOLYMER DISPERSIONS

PRIOR ART

Japanese Patent 59-6219 discloses a method of producing emulsions of polyether or polyester polymers containing reactive silicon groups in terminal positions. The reactive silicon group is a silicon hydride, a silanol, or alkoxysilyl group. The method comprises forming an emulsion by mixing a silicon modified polyether or polyester polymer with an average molecular weight of between 500 and 15,000, an anionic, cationic, nonionic or amphoteric surfactant, and water with sufficient shear and for a sufficient period of time to form an emulsion. The ratio of polyether or polyester polymer to surfactant is 100:1–30. The present invention differs because it teaches an emulsion having crosslinked particles, whereas Japanese Patent 59-6219 teaches an non-crosslinked emulsion.

SUMMARY OF THE INVENTION

The present invention relates to an aqueous dispersion of a crosslinked silicon-modified organic polymer. The dispersion is formed by dispersing a preformed, but not crosslinked polymer in water with the aid of a surfactant. The dispersed polymer is then crosslinked by one of several methods which provides a stable dispersion of the crosslinked polymer. Upon drying the dispersion, a useful elastomeric material is formed. The preformed polymer is capable of crosslinking via condensation reactions and has a viscosity of greater than 5000 cps but less than 500,000 cps if required, 0.1 to 10 weight parts of a crosslinking agent; and, if required, depending on the nature of the catalyst and silicon cure system, 0.0001 to 10 weight parts of a catalyst; 0.5 to 10 weight parts of a surfactant or surfactant mixture; and 0.5 to 1000 weight parts water per 100 weight parts preformed polymer. Optionally, adhesion promoters, pigments, reinforcing or non-reinforcing fillers, compatible silicone or organic resins, stabilizers, freeze/thaw additives, thickeners, UV stabilizers, antioxidants, etc. may also be added to the dispersion. The viscosity of the preformed polymer may be adjusted by mixing with other, lower molecular weight polymers, which may be either siloxane polymers, silicon modified organic polymers or organic polymers which are not modified with silicon atoms, or by mixing with lower molecular weight plasticizers, organic solvents, etc. The dispersion is produced by emulsifying the polymer phase in one of the following ways: (a) the surfactant and at least a fraction of the water are premixed at a temperature ranging from about 10° C. to about 80° C. until the surfactant is completely solubilized, then the polymer phase is slowly added to the aqueous surfactant solution under vigorous mixing at a temperature ranging from about 10° C. to 80° C. until a homogenous emulsion is obtained; (b) the surfactant is mixed into the polymer phase at a temperature ranging from about 10° C. to about 80° C. until a homogenous mixture results, then at least a fraction of the water is added under vigorous stirring at a temperature ranging from about 10° C. to 80° C. until a homogenous emulsion is obtained; or (c) an aqueous solution of the surfactant is added to the polymer phase under vigorous stirring at a temperature ranging from about 10° C. to about 80° C. until a homogenous emulsion is obtained.

Before emulsification, the polymer phase may contain one or all of the other composition ingredients, with the exception of water. The polymer phase, thus, may contain crosslinker, catalyst, filler, pigments, etc. It is important to note that all process options may be practiced in such a manner that not all of the water is added at once. The water may be added in two or more steps.

The preferred process for option (b) of this invention is to add initially only a small amount of water (0.5–20 weight parts based on 100 weight parts polymer) so that initially a thick phase or, at solids content above 90%, a gel phase is being formed.

The preferred process for option (c) of this invention is to add only a small amount of an aqueous solution of the total amount of surfactant (0.5–20 weight parts water and 0.5 to 10 weight parts surfactant based on 100 weight parts polymer) so that initially a thick phase or, at solids content above 90%, a gel phase is being formed. The thick phase or gel phase provides for higher shear which results in a lower average particle size for a given mixing process and given mixing time. It may also be desirable to emulsify initially only a certain amount of the polymer phase, for instance 60–80% of the total amount, and then to add the remaining polymer quantity to the emulsion under continued mixing/shearing ("polymer cut-back method"). In the most preferred practice of this invention, the polymer phase is emulsified by mixing, as a minimum, 100 weight parts of polymer, 0.5 to 10 weight parts surfactant, and not more than 10 weight parts of water under sufficient shear and for a sufficient period of time to obtain a homogenous high solids "oil-in-water" emulsion forming a characteristic gel phase having at least 90% polymer solids content and having particle sizes between 0.1 and 5 micrometers, preferably between 0.2 and 2 micrometers. Cross-linker, if required, and catalyst, if required, and optional further ingredients may be added directly to the high solids gel phase or after dilution of the gel with further water to the desired solids content. Alternatively, either cross-linker or catalyst, or both, as well as one or all of the further optional ingredients may be added to the mixture prior to the emulsification step. In order to practice the instant invention it is not required to match the viscosities of the polymer phase and the surfactant/ water phase. The crosslinked polymer dispersion can be transformed into an elastomer by removal of water.

The present invention represents several significant advances in the art. First, the process of making aqueous dispersions of crosslinked silicon modified organic polymers by emulsification and crosslinking of pre-formed polymers is new. In the preferred options the formation of a high solids thick phase or gel phase provide for a higher shear and smaller average particle size. Second, the process of making the dispersion is further improved in as far as it does not require matching of the viscosities of the polymer phase and the water/surfactant phase. In the preferred process of the invention, the polymer phase is emulsified with a small amount of aqueous surfactant solution, resulting in a high solids thick phase or gel phase after the emulsification. The higher shear forces which the emulsion particles are exposed to in the high solids emulsion phase permit the desired particle size distribution to be achieved within a shorter period of time than when the process is carried out at lower solids contents. Finally, the present invention teaches that the addition of certain types of fillers to alter the physical characteristics of the resulting elastomer. A further advantage of the present invention is that, at high solids contents (above 75%), the composition does not require thickeners or other rheology modifiers to achieve excellent handling characteristics, such as desired extrusion rate and "body" of the dispersion (resistance of the wet material felt during tooling of the dispersion). A further advantage of the present invention is the versatility of the process, allowing mixing of polymer, water, surfactant, and optionally cross-linker and catalyst in the manufacture of a high solids oil-in-water emulsion as a gel phase intermediate, which is then either immediately afterwards or after storage further processed by adding additional ingredients and diluting the dispersion to the desired solids content. Finally, the present invention can be practiced with a wide variety of polymers and silicon cure chemistries which allows for manufacture of products with improved shelf-life, compatibility, and low toxicity.

DETAILED DESCRIPTION OF THE INVENTION

The present invention is a crosslinked polymer dispersion comprising a pre-formed polymer, capable of crosslinking via condensation or addition reactions, and having a viscosity of greater than 5 Pa.s but less than 500 Pa.s; if required, 0.1 to 10 weight parts of a crosslinking agent; and, if required, depending on the nature of the catalyst and silicon cure system, 0.0001 to 10 weight parts of a catalyst; 0.5 to 10 weight parts of a surfactant or surfactant mixture; and 0.5 to 1000 weight parts water per 100 weight parts polymer. Optionally, adhesion promoters, pigments, reinforcing or non-reinforcing fillers, compatible silicone or organic resins, stabilizers, freeze/thaw additives, thickeners, UV stabilizers, antioxidants, etc. may also be added to the dispersion. The viscosity of the polymer may be adjusted by mixing with other, lower molecular weight polymers, which may be either siloxane polymers, silicon modified organic polymers, or organic polymers which are not modified with silicon atoms; or by mixing with lower molecular weight plasticizers, organic solvents, etc. The dispersion is produced by emulsifying the polymer phase in one of the following ways: (a) The surfactant and at least a fraction of the water are premixed at a temperature ranging from about 10° C. to about 80° C. until the surfactant is completely solubilized, then the polymer phase is slowly added to the aqueous surfactant solution under vigorous mixing at a temperature ranging from about 10° C. to 80° C. until a homogenous emulsion is obtained; (b) the surfactant is mixed into the polymer phase at a temperature ranging from about 10° C. to about 80° C. until a homogenous mixture results, then at least a fraction of the water is added under vigorous stirring at a temperature ranging from about 10° C. to 80° C. until a homogenous emulsion is obtained; or (c) an aqueous solution of the surfactant is added to the polymer phase under vigorous stirring at a temperature ranging from about 10° C. to about 80° C. until a homogenous emulsion is obtained. Before emulsification, the polymer phase may contain one or all of the other composition ingredients, with the exception of water. The polymer phase, thus, may contain cross-linker, catalyst, filler, pigments, etc. It is important to note that all process options may be practiced in such a manner that not all of the water is added at once. The water may be added in two or more steps. The preferred process for option (b) of this invention is to add initially only a small amount of water (0.5–20 weight parts based on 100 weight parts polymer) so that initially a thick phase or, at solids content above 90%, a gel phase is being formed. The preferred process for option (c) of this invention is to add only a small amount of an aqueous solution of the total amount of surfactant (0.5–20 weight parts water and 0.5 to 10 weight parts surfactant based on 100 weight parts polymer) so that initially a thick phase or, at solids content above 90%, a gel phase is being formed. The thick phase or gel phase provide for higher shear which results in a lower average particle size for a given mixing process and given mixing time. It may also be desirable to emulsify initially only a certain amount of the polymer phase, for instance 60–80% of the total amount, then to add the remaining polymer quantity to the emulsion under continued mixing/shearing ("polymer cut-back method"). In the most preferred practice of this invention, the polymer phase is emulsified by mixing, as a minimum, 100 weight parts of polymer, 0.5 to 10 weight parts surfactant, and not more than 10 weight parts of water under sufficient shear and for a sufficient period of time to obtain a high solids "oil-in-water" emulsion forming a characteristic gel phase having at least 90% polymer solids content and having particle sizes between 0.1 and 5 micrometers, preferably between 0.2 and 2 micrometers. Cross-linker, if required, and catalyst, if required, and optional further ingredients may be added directly to the high solids gel phase or after dilution of the gel with further water to the desired solids content. Alternatively, either cross-linker or catalyst, or both, as well as one or all of the further optional ingredients may be added to the mixture prior to the emulsification step. In order to practice the instant invention it is not required to match the viscosities of the polymer phase and the surfactant/water phase. The crosslinked polymer dispersion can be transformed into an elastomer by removal of water.

Polymer Phase

The polymer of this invention is selected from the group consisting of silicon modified organic polymers, mixtures of silicon modified organic polymers, blends of silicon modified organic polymer(s) with regular organic polymer(s), blends of silicon modified organic polymer(s) with siloxane polymer(s), mixtures of above polymers, and mixtures of above polymer(s) with organic plasticizers or solvents. The polymer of this invention is characterized as having a viscosity of greater than 5000 cps but less than 500,000 cps.

These silicon modified organic polymers are characterized by an organic polymer chain to which at least one reactive silyl or siloxane group has been attached. The reactive silyl or siloxane group(s) may be attached in terminal and/or pendant positions on the polymer chain. If desirable, the reactive silyl or siloxane group may be present both at terminal and pendant positions on the polymer chain. If the formation of an elastomeric cured product having high strength and elongation is desirable, it may be preferable to have the reactive groups at the terminals of the polymer chain. The silicon modified organic polymer contains at least one reactive silicon group. In order to obtain sufficient curability, however, it is desirable that the polymer contains on average at least 1.1, more preferably from 1.5 to 4 reactive silicon groups. If the number of reactive silicon groups contained in one polymer molecule is less than 1, the composition containing the silicon modified organic polymer does not cure to an elastomer.

There are no particular restrictions on the reactive silicon group(s) contained on the organic polymer of the polymer phase, but typical examples are the groups represented by the following formula (I):

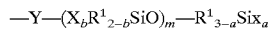

wherein R is the same or different alkyl, alkenyl, aryl, or aralkyl group having from 1 to 20 carbon atoms, or a triorganosiloxy group represented by $R^2_3SiO$—, where $R^2$ individually represents monovalent hydrocarbon groups having from 1 to 20 carbon atoms, X is the same or different hydrogen, hydroxyl group, or a condensable or hydrolyzable group, Y is a divalent group which forms hydrolytically stable bonds to the organic polymer and to a silicon atom of the substituent; a is an integer from 0 to 3, b is the same or different integer from 0 to 2, a and b satisfy the relationship $(a+b) \geq 1$, m is an integer of from 0 to 19.

The number of silicon atom(s) existing in the reactive silicon group may be 1 or 2 or more, and, in the case of the reactive silicon group to which further silicon atoms are bonded via siloxane bonds, about 20 silicon atoms may exist.

Because of easy availability, a reactive silicon group represented by the following formula (II) is preferred:

$$-SiR^1_{3-a}X_a$$

where $R^1$, X, and a are the same as defined above.

The silicon modified organic polymer can be prepared through various processes. One example of the processes comprises reacting an organic polymer containing certain functional groups (designated as Y' group) with a compound having a functional group capable of reacting with the Y' group (designated as Y" group) and a reactive silicon group to thereby introduce the reactive silicon group into the organic polymer. Another example of such a process is where the functional group Y" is attached to the reactive silicon group. Upon reaction of Y' and Y", a new group Y is formed, which attaches the reactive silicon group to the organic polymer. A silicon modified organic polymer with reactive silicon groups in terminal positions may thus be represented by the formula (III):

$$X_aR^1_{3-a}Si-(X_bSiOR^1_{2-b})_m-Y-(polymer)-Y-(X_bSiOR^1_{2-b})_m-SiR^1_{3-a}X_a$$

wherein $R^1$, X, a, b, and m are as defined above, Y can be any group formed by the reaction of Y' and Y" with the limitation that Y is hydrolytically stable at room temperature; and (polymer) represents an organic polymer or co-polymer with an essentially elastomeric backbone. The linking radical Y is selected from the class consisting of alkylene, ether, ester, carbonate, urethane, urea, and thiourethane radicals. Examples of Si—Y—are Si—$R^4$, Si—$R^4$—O—, Si—$R^4$—C(O)O—, Si—$R^4$—O—C(O)—, Si—$R^4$—O—C(O)—$R^5$—C(O)—O—, Si—$R^4$—O—C(O)—O—, Si—$R^4$—NH—C(O)—O, Si—$R^4$—O—C(O)—NH—$R^5$—NH—C(O)—, and Si—$R^4$—NH—C(O)—$R^5$—NH—C(O)—O—, Si—$R^4$—S—C(O)—NH—wherein $R^4$ represents an alkylene or substituted alkylene radical having from 1 to 8 carbon atoms, arylalkylene or substituted arylalkylene radical having from 7 to 19 carbon atoms, alkyleneoxyalkylene radicals, aryleneoxyalkylene radicals, and saturated cycloalkylene radicals; $R^5$ is selected from the same group as $R^4$ and in addition can include arylene radicals. (Polymer) represents an organic polymer or co-polymer. Examples of such polymers are polyether, polyester, ether-ester block co-polymer, polyurethane, polysulfide, polythioether, polythioester, polybutadiene, hydrogenated polybutadiene, styrene-butadiene co-polymer, acrylate-butadiene co-polymer, ethylene-butadiene co-polymer, vinylpyridinebutadiene co-polymer, ethylene-propylene co-polymer, ethylenevinyl acetate co-polymer, ethylene-acrylate co-polymer, polyisoprene, styrene-isoprene co-polymer, polyisobutylene, isobutylene-isoprene co-polymer, polychloroprene, styrene-chloroprene co-polymer, acrylonitrile-chloroprene co-polymer, polyacrylate, polymethacrylate, siloxane-ether block co-polymer, siloxane-olefin block co-polymer, fluorolefin-ether co-polymer, poly(perfluoroether), etc. Among these polymers, polyether, polyester, polyisobutylene, ether-ester block co-polymer, polyacrylate, polymethacrylate, siloxane block co-polymers, and fluoroolefin-ether co-polymer are preferable. The (polymer) preferably has a number average molecular weight of from 1,000 to 50,000, more preferably from 5,000 to 30,000.

X can be hydrogen, a hydroxyl group, or any condensable or hydrolyzable group. The term "hydrolyzable group" means any group attached to the silicon which is hydrolyzed by water at room temperature. The hydrolyzable group X includes hydrogen, halogen atoms such as F, Cl, Br or I; groups of the formula —OY when Y is any hydrocarbon or halogenated hydrocarbon group such as methyl, ethyl, isopropyl, octadecyl, allyl, hexenyl, cyclohexyl, phenyl, benzyl, beta-phenylethyl, any hydrocarbon ether radical such as 2-methoxyethyl, 2-ethoxyisopropyl, 2-butoxyisobutyl, p-methoxyphenyl or —$(CH_2CH_2O)_2CH_3$; or any N,N-amino radical such as dimethylamino, diethylamino, ethylmethylamino, diphenylamino, or dicyclohexylamino. X can also be any amino radical such as $NH_2$, dimethylamino, diethylamino, methylphenylamino or dicyclohexylamino; any aminoxy radical —O—$NR_2$; any ketoxime radical of the formula —ON=$CM_2$ or —ON=CM' in which M is any monovalent hydrocarbon or halogenated hydrocarbon radical such as those shown for Y above and M' is any divalent hydrocarbon radical both valences of which are attached to the carbon, such as hexylene, pentylene or octylene; ureido groups of the formula —N(M)CONM"$_2$ in which M is defined above hydrocarbon radical such as those shown for Y above and M" is H or any of the M radicals; carboxyl groups of the formula —OOCMM" in which M and M" are defined above or halogenated hydrocarbon radical as illustrated for Y above, or carboxylic amide radicals of the formula —NMC=O (M") in which M and M" are defined above. X can also be the sulfate group or sulfate ester groups of the formula —$OSO_2$(OM) where M is defined above hydrocarbon or halogenated hydrocarbon radical illustrated for Y; the cyano group; the isocyanate group; and the phosphate group or phosphate ester groups of the formula —OPO(OM)$_2$ in which M is defined above.

R is individually selected from the group consisting of aliphatic, alkyl, aminoalkyl, polyaminoalkyl, epoxyalkyl, alkenyl organic, and aromatic aryl groups. Most preferred are the methyl, ethyl, octyl, vinyl, allyl, and phenyl groups.

The most preferred groups of the invention are hydroxyl groups or alkoxy groups. Illustrative examples of the alkoxy groups are methoxy, ethoxy, propoxy, butoxy, isobutoxy, pentoxy, hexoxy, 2-ethylhexoxy, and the like; alkoxy radicals such as methoxymethoxy, ethoxymethoxy, and the like; and alkoxyaryloxy such as ethoxyphenoxy and the like. The most preferred alkoxy groups are methoxy or ethoxy.

The silicon modified polymer is typically prepared through one of the following processes:

(1) a process comprising reacting (hydrosilylating) an organic polymer having unsaturated group(s) with a hydrosilane or hydrosiloxane compound, bearing a condensable or hydrolyzable group, e.g. $HSi(OCH_3)_3$, in the presence of a Group VIII transition metal compound as a catalyst;

(2) a process comprising an addition reaction, in the presence of a free radical initiator, between an organic polymer having an unsaturated group and a compound bearing a mercapto group and a reactive silicon group, e.g. HS(CH$_2$)$_3$Si(OCH$_3$)$_3$;

(3) a process comprising an addition reaction, in the presence of a free radical initiator, between an organic polymer bearing mercapto groups and a compound bearing an unsaturated group and a reactive silicon group, e.g. CH$_2$=CH—Si(OCH$_3$)$_3$ or CH$_2$=CH—(CO)O—(CH$_2$)$_3$—Si(CH$_3$)(OCH$_3$)$_2$;

(4) a process comprising reacting an organic polymer having an isocyanate group with a compound having an active hydrogen and a reactive silicon group, e.g. H$_2$N(CH$_2$)$_3$Si(OCH$_3$)$_3$ (amino), H$_2$N(CO)N(CH$_3$)Si(OCH$_3$)$_3$ (ureido), or HS(CH$_2$O)$_3$Si(OCH$_3$)$_3$ (mercapto);

(5) a process comprising reacting an organic polymer having a hydroxyl group with a compound having an isocyanate group and a reactive silicon group, e.g. OCN(CH$_2$)$_3$Si(OCH$_3$)$_3$;

(6) a process comprising reacting an organic polymer having an active hydrogen (e.g. hydroxyl or amino group) with a compound having an epoxy group and a reactive silicon group, e.g. CH$_2$(O)CH—(CH$_2$)$_3$—Si(OCH$_3$)$_3$;

(7) a process comprising reacting an organic polymer having epoxy groups with a compound having an active hydrogen (e.g. hydroxyl group or amino group) and a reactive silicon group, e.g. H$_2$N(CH$_2$)$_3$Si(OCH$_3$)$_3$ (amino), H$_2$N(CO)N(CH$_3$)Si(OCH$_3$)$_3$ (ureido), or HS(CH$_2$O)$_3$Si(OCH$_3$)$_3$ (mercapto);

(8) a process comprising reacting an organic polymer having active hydrogen (e.g. hydroxyl groups) with a dicarboxylic acid chloride or anhydride, then reacting the resultant intermediate with a compound having an active hydrogen (e.g. amino, mercapto or hydroxyl group) and a reactive silicon group, e.g. H$_2$N(CH$_2$)$_3$Si(OCH$_3$)$_3$ (amino), H$_2$N(CO)N(CH$_3$)Si(OCH$_3$)$_3$ (ureido), or HS(CH$_2$O)$_3$Si(OCH$_3$)$_3$ (mercapto);

(9) a process comprising reacting an organic polymer having carboxylic acid ester, carboxylic acid chloride, or carboxylic acid anhydride groups with a compound having active hydrogen atoms (e.g. amino, mercapto or hydroxyl groups) and a reactive silicon group, e.g. H$_2$N(CH$_2$)$_3$Si(OCH$_3$)$_3$ (amino), H$_2$N(CO)N(CH$_3$)Si(OCH$_3$)$_3$ (ureido), or HS(CH$_2$O)$_3$Si(OCH$_3$)$_3$ (mercapto);

(10) a process comprising reacting an organic polymer having hydroxyl groups with metallic sodium to replace the hydrogen of the hydroxy group with sodium, then reacting the intermediate with a chloroalkylsilane (Williamson reaction);

(11) a process comprising the reaction of an organic polymer having hydroxyl groups with a compound having a carboxylalkyl group and a reactive silicon group;

(12) a process comprising addition polymerizing (a) an ethylenically unsaturated monomer in the presence of (b) an ethylenically unsaturated monomer having a reactive silicon group;

(13) a process comprising addition polymerizing (a) an ethylenically unsaturated monomer in the presence of (b) an ethylenically unsaturated monomer having a reactive silicon group, (c) a polymerization initiator having a reactive silicon group and (d) a chain transfer agent having a reactive silicon group; contrary to process option (8), this process option results in an organic polymer with terminal reactive silicon groups;

(14) a process comprising addition polymerizing (a) an ethylenically unsaturated monomer in the presence of (b) an ethylenically unsaturated monomer having a reactive silicon group, (c) a monomer having two independent ethylenically unsaturated bonds, (d) a polymerization initiator having a reactive silicon group and (e) a chain transfer agent having a reactive silicon group;

Hydrosilylation of organic polymers having unsaturated group(s) with a hydrosilane are, for instance, described in British Patent No. 1,058,385, U.S. Pat. Nos. 3,408,321, 3,441,534, 3,448,072, 3,471,440, 3,592,795, 5,227,434, 5,298,572, Belgian Patent Nos. 0,869,940, 0,873,232, 0,895,327, Japanese Patent Nos. 54,006,096, 54,123,196, 55,129,405, 57,158,226, 59,131,625, 61,159,419, 01,022,904, 01,170,604, 03,167,254, 03,203,955, 05,125,175, German Patent No. 3,011,020, European Patent Nos. 0,252,372, 0,496,109, and World Patent No. 9,010,037; all patents being incorporated herein by reference.

The addition reaction between an organic polymer having an unsaturated group and a compound bearing a mercapto group and a reactive silicon group is described, for instance, in Japanese Patent Nos. 55,137,129, 63,112,605, 03,195,768, and 04,363,319; all patents being incorporated herein by reference.

The addition reaction between an organic polymer bearing mercapto groups and a compound bearing an alkenyl group and a reactive silicon group is described, for instance, in U.S. Pat. No. 4,652,610 and Japanese Patent No. 61,238,848; the patents being incorporated herein by reference.

The reaction of an organic polymer having an isocyanate group with a compound having an active hydrogen and a reactive silicon group is described, for instance, in U.S. Pat. Nos. 3,627,722, 3,632,557, 4,067,844, 4,222,925, 4,374,237, Belgian Patent No. 0,833,615, German Patent Nos. 2,551,275, 3,426,987, 3,629,237, 3,907,991, 4,029,505, Japanese Patent No. 59,024,771, European Patent Nos. 0,210,444, 0,300,304, World Patent No. 94/14820, and in "Silylated urethane polymers and their applications in adhesives and sealants" by Ta-Min Feng, OSi Specialties, Inc., Tarrytown, N.Y., in Adhesives and Sealants Council Spring 1994 Short-Course; all patents and literature being incorporated herein by reference.

The reaction of an organic polymer having an active hydrogen (such as in a hydroxy, mercapto, amino, amido, etc. group) with a compound having an isocyanate group and a reactive silicon group is described, for instance, in U.S. Pat. Nos. 4,345,053, 4,625,012, European Patent No. 0,354,472, and World Patent No. 93/05089; all patents being incorporated herein by reference.

The reaction of an organic polymer having an active hydrogen (e.g. hydroxyl or amino group) with a compound having an epoxy group and a reactive silicon group is described, for instance, in Japanese Patent Nos. 63,083,131, 63,125,566, 63,230,721, 03,168,245, and European Patent No. 0,341,322; all patents being incorporated herein by reference.

The reaction of an organic polymer having epoxy groups with a compound having an active hydrogen (e.g. hydroxyl group or amino group) and a reactive silicon group is described, for instance, in Japanese Patent Nos. 62,181,321 and 04,363,315; all patents being incorporated herein by reference.

The reaction of an organic polymer having active hydrogen (e.g. hydroxyl groups) with a dicarboxylic acid chloride or anhydride followed by reaction of the resultant intermediate with a compound having an active hydrogen (e.g. amino, mercapto or hydroxyl group) and a reactive silicon group, is described, for instance, in U.S. Pat. Nos. 3,678,010; the patent being incorporated herein by reference.

The reaction of an organic polymer having carboxylic acid ester, carboxylic acid chloride, or carboxylic acid anhydride groups with a compound having active hydrogen atoms (e.g. amino, mercapto or hydroxyl groups) and a reactive silicon group is described, for instance, in Japanese Patent No. 04,359,018; the patent being incorporated herein by reference.

The reaction of addition polymerizing an ethylenically unsaturated monomer in the presence of an ethylenically unsaturated monomer having a reactive silicon group, optionally in the presence of a chain transfer agent, is described, for instance, in British Patent Nos. 1,096,898, 1,183,585, Japanese Patent Nos. 59,078,220, 59,078,221, 59,078,222, 01,165,609, European Patent Nos. 0,122,457, 0,159,715, and 0,159,716; all patents being incorporated herein by reference.

The silicon modified organic polymer used in the present invention is not limited to those obtained by the above described processes. Silicon modified polymers obtained by any other process may also be employed.

When the silicon modified polymer has an average of more than two condensable or hydrolyzable groups per molecule, it is not necessary to have a cross-linker present in order for a crosslinked polymer to form. The condensable or hydrolyzable groups on different polymer molecules can react with each other to form the required crosslinks.

The composition of the present invention may also contain siloxane polymers of formula (IV) in mixture with the silicon modified organic polymer or alkylene functional organic polymer:

where n is 0, 1, 2 or 3 and u is an integer from 500 to 5000, and X is hydrogen, a hydroxyl group or any condensable or hydrolyzable group, and $Z^1$ and $Z^2$ are Si or $Z^1$ is Si—$(CH_2)_m$—$SiR^1_2$ and $Z^2$ is $SiR^1_2$—$(CH_2)_m$—Si, where m is an integer from 1 to 10, R is individually selected from the group consisting of aliphatic alkyl, aminoalkyl, polyaminoalkyl, epoxyalkyl, alkenyl organic, or aromatic aryl groups, and $R^1$ is individually selected from the group consisting of X, aliphatic alkyl, alkenyl, and aromatic phenyl groups. Most preferred $R^1$ groups are methyl, ethyl, octyl, trifluoropropyl, vinyl, and phenyl groups.

The siloxane polymer itself can be a mixture of different kinds of molecules, for example long chain linear molecules and short chain linear or branched molecules. The siloxane oligomer, polymer, or resin may also serve as cross-linker for the silicon modified organic polymer. Such siloxanes which can take the place of more conventional cross-linkers are illustrated by low molecular weight organosilicon hydrides, such as polymethylhydrogensiloxane, low molecular weight copolymers containing methylhydrogensiloxy and dimethylsiloxy groups, —(OSi(OEt)$_2$—, (ethylpolysilicate), (OSiMeC$_2$H$_4$Si(OMe)$_3$)$_4$, and (OSi—MeON=CR'$_2$)$_4$, where Me is methyl and Et is ethyl.

The siloxane polymer of the present invention, thus, more advantageously also comprises mixtures of siloxane polymers of formula (I), exemplified by, but not limited to, mixtures of a,w-hydroxysiloxy terminated siloxanes and of a,w-bis(triorganosiloxy) terminated siloxanes, mixtures of a,w-hydroxylsiloxy terminated siloxanes and of a-hydroxy, w-triorgano-siloxy terminated siloxanes, mixtures of a,w-dialkoxysiloxy terminated siloxanes and of a,w-triorganosiloxy terminated siloxanes, mixtures of a,w-dialkoxysiloxy terminated siloxanes and of a,w-hydroxysiloxy terminated siloxanes, mixtures of a,w-hydroxysiloxy terminated siloxanes and of a,w-triorganosiloxy terminated poly(diorgano)(hydrogenorgano) siloxane co-polymers, etc. The siloxane polymer of the invention can also comprise mixtures of siloxane polymers of formula (I) as described above with liquid, branched methylpolysiloxane polymers ("MDT fluids") comprising a combination of recurring units of the formulae:

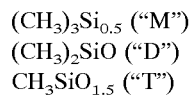

and containing from 0.1 to 8% hydroxyl groups. The fluids may be prepared by co-hydrolysis of the corresponding chloro- or alkoxysilanes, as described in U.S. Pat. Nos. 3,382,205; 3,661,817; 3,714,089; 4,356,116; 4,468,760; 5,175,057 and Belgian Patent No. 0,877,267. The proportion of MDT fluids added should not exceed 50 parts, preferably of 1 to 20 parts by weight, per 100 parts by weight of the polymer of formula (I), in order to achieve improved physical properties and adhesion of the resultant polymers. The siloxane polymer can also comprise mixtures of siloxane polymers of formula (I) with liquid or solid, branched methylsiloxane polymeric resins comprising a combination of recurring units of the formulae:

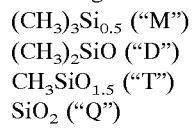

and containing from 0.1 to 8% hydroxyl groups, the fluids may be prepared by co-hydrolysis of the corresponding chloro- or alkoxysilanes, as described in U.S. Pat. Nos. 2,676,182; 2,441,320; 4,707,531; 5,070,175; EP 0,529,547; 0,535,687; DE 4,124,588; JP 05,098,012; WO 93/23455. The MDTQ fluid/resin may be added in a proportion not exceeding 50 parts, preferably of 1 to 10 parts by weight, per 100 parts by weight of the polymer of formula (I) to improve physical properties and adhesion of the resultant polymers. MDTQ fluids/resins can also be mixed with MDT fluids and the polymers of Formula (I). Finally the siloxane polymer can comprise mixtures of siloxane polymers of Formula (I) with compatible organic solvents, to form organic polymer/solvent mixtures. These organic solvents are exemplified by, but not limited to, organophosphate esters, such as trioleylphosphate, trioctylphosphate, or tetraethyleneglycolmonolauryletherphosphate, as disclosed in U.S. Pat. No. 4,147,855 and German Patent No. 2,802,170 (incorporated by reference); alkanes, such as hexane, heptanes; and higher paraffins, aromatic solvents, such as toluene, benzene; etc. The polymer solvent mixtures can also be added with MDT fluids and/or MDTQ fluids to the polymer of Formula I. Any of the above mixtures of polymers or polymer/solvents can be prepared by mixing the ingredients prior to emulsification or by emulsifying them individually and then mixing the emulsions.

The polymer may also be a mixture of a silicon modified organic polymer and a compatible, liquid, functional or non-functional organic polymers, exemplified by, but not limited to, polyacrylates, polyalkylbenzenes, polyalkenes, such as polyisobutylene or epoxy functional polyisobutylene, polyether glycols, etc.

The polymer may also be a mixture of a silicon modified organic polymer and a compatible organic plasticizer or solvent, exemplified by, but not limited to, dioctylphthalate, organophosphate esters, such as trioleylphosphate, trioctylphosphate, or tetraethyleneglycolmonolauryletherphosphate, as disclosed in U.S. Pat. No. 4,147,855 and German Patent No. 2,802,170 (incorporated by reference); alkanes, such as hexane, heptanes; and higher paraffines, aromatic solvents, such as toluene, benzene; etc.

Any of the above mixtures of polymers or polymer/solvents can be prepared by mixing the ingredients prior to emulsification or by emulsifying them individually and then mixing the emulsions.

Surfactants

The surfactant of the present invention is selected from nonionic surfactants, cationic surfactants, anionic surfactants, amphoteric surfactants and mixtures thereof. The term "surfactant" is meant to describe a surfactant selected from these categories or a mixture of surfactants from the above referenced categories. The surfactant is present in the composition in an amount of 0.5 to 10 parts by weight, preferably 5 to 10 parts by weight, based on 100 parts by weight of polymer. Surfactant in an amount less than 3 parts by weight based on 100 parts by weight of polymer may also be used to achieve desirable results.

Most preferred are nonionic surfactants known in the art as being useful in emulsification of organic or siloxane polymers. Useful nonionic surfactants may be exemplified, but not limited to, polyoxyalkylene alkyl ethers, polyoxyalkylene sorbitan esters, polyoxyalkylene esters, polyoxyalkylene alkylphenyl ethers, ethoxylated amides and others. Non-ionic surfactants commercially available and useful in the instant invention may be further exemplified by, but not limited to, TERGITOL TMN-6, TERGITOL 15S40, TERGITOL 15S3, TERGITOL 15S5, and TERGITOL 15S7 produced by Union Carbide Corporation (Danbury, Conn.), BRIJ 30 and BRIJ 35 produced by ICI CHEMICALS (Wilmington, Del.) and TRITON X405 produced by ROHM AND HAAS (Philadelphia, Pa.) MAKON 10 produced by STEPAN Company (Northfield, Ill.), and ETHOMID O/17 produced by AKZO Chemicals Inc. (Chicago, Ill.).

Cationic and anionic surfactants known in the art as being useful in emulsification of organic or siloxane polymers are also useful as the surfactant in the instant invention. Suitable cationic surfactants include, but are not limited to, aliphatic fatty amines and their derivatives such as dodecylamine acetate, octadecylamine acetate and acetates of the amines of tallow fatty acids; homologues of aromatic amines having fatty chains such as dodecylanalin; fatty amides derived from aliphatic diamines such as undecylimidazoline; fatty amides derived from disubstituted amines such as oleylaminodiethylamine; derivatives of ethylene diamine; quaternary ammonium compounds such as tallow trimethyl ammonium chloride, dioctadecyldimethyl ammonium chloride, didodecyldimethyl ammonium chloride and dihexadecyldimethyl ammonium chloride; amide derivatives of amino alcohols such as beta-hydroxyethylsteraryl amide; amine salts of long chain fatty acids; quaternary ammonium bases derived from fatty amides of di-substituted diamines such as oleylbenzylamino-ethylene diethylamine hydrochloride; quaternary ammonium bases of the benzimidazolines such as methylheptadecyl benzimidazole hydrobromide; basic compounds of pyridinium and its derivatives such as cetylpyridinium chloride; sulfonium compounds such as octadecylsulfonium methyl sulfate; quaternary ammonium compounds of betaine such as betaine compounds of diethylamino acetic acid and octadecylchloro-methyl ether; urethanes of ethylene diamine such as the condensation products of stearic acid and diethylene triamine; polyethylene diamines; and polypropanolpolyethanol amines.

Cationic surfactants commercially available and useful in the instant invention include, but are not limited to ARQUAD T27W, ARQUAD 16-29, ARQUAD C-33, ARQUAD T50, ETHOQUAD T/13 ACETATE, all manufactured by AKZO CHEMIE (Chicago, Ill.).

Suitable anionic surfactants include, but are not limited to, sulfonic acids and their salt derivatives. The anionic surfactants useful in the instant invention can be exemplified by, but are not limited to, alkali metal sulforicinates; sulfonated glycerol esters of fatty acids such as sulfonated monoglycerides of coconut oil acids; salts of sulfonated monovalent alcohol esters such as sodium oleylisethionate; amides of amino sulfonic acids such as the sodium salt of oleyl methyl tauride; sulfonated products of fatty acids nitriles such as palmitonitrile sulfonate; sulfonated aromatic hydrocarbons such as sodium alpha-naphthalene monosulfonate; condensation products of naphthalene sulfonic acids with formaldehyde; sodium octahydroanthracene sulfonate; alkali metal alkyl sulfates, ether sulfates having alkyl groups of 8 or more carbon atoms, and alkylarylsulfonates having 1 or more alkyl groups of 8 or more carbon atoms.

Anionic surfactants commercially available and useful in the instant invention include, but are not limited to, POLYSTEP A4, A7, A11, A15, A15-30K, A16, A16-22, A18, A13, A17, B1, B3, B5, B11, B12, B19, B20, B22, B23, B24, B-25, B27, B29, C-OP3S; ALPHA-STEP ML40, MC48; STEPANOL MG; all produced by STEPAN Co. (Northfield, Ill.), HOSTAPUR SAS produced by HOECHST CELANESE (Chatham, N.J.), HAMPOSYL C30 and L30 produced by W. R.GRACE & CO. (Lexington, Mass.).

Suitable amphoteric surfactants include, but are not limited to, glycinates, betaines, sultaines and alkyl aminopropionates. These can be exemplified by cocoamphglycinate, coco-amphocarboxy-glycinates, cocoamidopropylbetaine, lauryl betaine, cocoamido-propylhydroxy-sultaine, laurylsulataine, and cocoamphodipropionate.

Amphoteric surfactants commercially available and useful in the instant invention include, but are not limited to, REWOTERIC AM TEG, REWOTERIC AM DLM-35, REWOTERIC AM B14 LS, REWOTERIC AM CAS, REWOTERIC AM LP produced by SHEREX CHEMICAL CO. (Division of WITCO) (Dublin, Ohio).

Water

In addition to adding the surfactant to the polymer or polymer mixture, the dispersion also includes a predetermined amount of water. The water is present in the composition in an amount of 0.5 to 1000 parts by weight of polymer, and is preferably present in the amount of 6 to 200 parts by weight of polymer.

Emulsification Process

The preferred process of the invention is that first a mixture of polymer, surfactant and water is formed, which then is emulsified by mixing with sufficient shear and for a sufficient period of time to form a high solids thick phase or gel phase. Either cross-linker or catalyst, if required, or both, if required, may be added to the mixture prior to or after emulsification. Further optional ingredients, such as adhesion promoters, pigments, fillers, antioxidants, UV stabilizers, etc. may be added either prior or after emulsification. If cross-linker, catalyst, and/or optional ingredients are added after the emulsification step, they may be added either prior or after diluting the high solids phase with water to the desired solids content. The high solids phase will have a polymer solids content of at least 90%, preferably in the range of 90% to 96%. The high solids phase may contain as much as 96–98% polymer.

It is anticipated that in industrial production, any type of mixing equipment may be used to perform the emulsification step, such as batch mixers, planetary mixers, continuous compounders such as single or multiple screw extruders, dynamic or static mixers, colloid mills, homogenizers, and sonolaters or combinations of these equipments, such a sonolators and static mixers, batch mixers and dynamic mixers, or dynamic and static mixers.

Dilution Step

After emulsification, the gel phase may be diluted with water to achieve the desired solids content. Generally, amounts in the range of 5 to 200 parts by weight may be added to achieve a solids content in the range of 90% to 30%. The water is added to achieve the desired product consistency or to facilitate the addition of other components of the composition, such as fillers, pigments, etc.

Adhesion Promoters

Adhesion promoters may be added as optional ingredient to the compositions taught by the present invention. They may be added either before or after the emulsification step. If added after the emulsification step, they may be added either before or after diluting the high solids phase with water to the desired solids content. Suitable adhesion promoters are exemplified by, but not limited to, silanes of the formula $$R_n SiX_{4-n}$$

where n is 0, 1 or 2, and X is hydrogen, a vinyl group, a hydroxyl group or condensable or hydrolyzable group of the same definition as used above, and R is individually selected from the group consisting of aliphatic alkyl, aminoalkyl, polyaminoalkyl, epoxyalkyl, alkenyl organic, or aromatic aryl groups as defined above.

Cross-linkers, Catalysts, Cure Chemistries

The cross-linkers and catalysts of the present invention depend on the type of silicon cure system employed to cure the composition. These curing mechanisms are well known to those skilled in the art, and are discussed below generally. It is of course contemplated that in accordance with the method of the present invention, the cross-linkers or catalysts may be added either individually before or after emulsification, or both added before or after emulsification.

Condensation Cures

One class of silicon cure systems involves condensation reactions, for instance between silanol (Si—OH) and siliconhydride (Si—H) groups; between silanol (Si—OH) and hydrolyzable or condensable silyl groups, such as Si—OC(O)CH$_3$, Si—NR$_2$, Si—ON═CR$_2$, etc.; between siliconhydride and hydrolyzable or condensable groups; between two hydrolyzable or condensable groups of the same or different species; between a hydrolyzable or condensable group and a polyhydric species, such as polyamines, polyalcohols, and the like. One example of this cure system is the reaction between an organic polymer bearing silanol groups and a crosslinking compound bearing hydrolyzable groups directly attached to silicon atom(s). Another example of this cure system is the reaction between an organic polymer bearing hydrolyzable or condensable groups directly attached to silicon atom(s) and a crosslinking compound bearing silanol groups. Another example of this cure system is the reaction between an organic polymer bearing hydrolyzable or condensable groups directly attached to silicon atom(s) and an organic or siloxane polymer bearing active hydrogen atoms, such as in hydroxyl, ureido, mercapto, or amino groups. A further example of this cure system is the reaction between two polymers, both of which may be organic or one may be organic and the other may be a siloxane polymer, bearing hydrolyzable or condensable groups attached directly to silicon atom(s). A further example of this cure system is the reaction of an organic polymer bearing silanol groups with a crosslinking compound bearing silicon hydride groups. The following condensation cure chemistries are considered useful for the practice of this invention:

(a) the polymer bears hydroxyl groups attached directly to silicon atom(s); and the crosslinking compound is a silane, a siloxane oligomer or polymer, a siloxane resin, or a silicon modified organic oligomer, polymer, or resin bearing hydrolyzable or condensable groups attached directly to silicon atom(s);

(b) the polymer bears hydrolyzable or condensable groups directly attached to silicon atom(s); and the crosslinking compound is a siloxane oligomer or polymer, a siloxane resin, a silica, a silicate, a siliconate, or a silicon modified organic oligomer, polymer or resin bearing silanol groups;

(c) the polymer bears hydrolyzable or condensable groups directly attached to silicon atom(s); and the crosslinking compound is a silane, a siloxane oligomer or polymer, a siloxane resin, or a silicon modified organic oligomer, polymer, or resin bearing hydrolyzable or condensable groups attached directly to silicon atom (s); the hydrolyzable groups on the polymer and the crosslinking compound being the same or different; and, if the crosslinking compound is a polymer, the polymer and the crosslinking compound being the same or different polymers;

(d) the polymer bears hydroxyl groups attached directly to silicon atom(s); and the crosslinking compound is a silane, a siloxane oligomer or polymer, a siloxane resin, or a silicon modified organic oligomer, polymer or resin bearing silicon hydride groups and, optionally, other hydrolyzable or condensable groups attached directly to silicon atom(s);

(e) the polymer bears hydrolyzable or condensable groups attached directly to silicon atom(s); and the crosslinking compound is a silane, a siloxane oligomer or polymer, a siloxane resin, or a silicon modified organic oligomer, polymer or resin bearing silicon hydride groups and, optionally, other hydrolyzable or condensable groups attached directly to silicon atom(s);

(f) the polymer bears silicon hydride groups and, optionally, other hydrolyzable or condensable groups attached directly to silicon atom(s) and the crosslinking compound is a silane, a siloxane oligomer or polymer, a siloxane resin, or a silicon modified organic oligomer, polymer, or resin bearing hydrolyzable or condensable groups;

(g) the polymer bears silicon hydride groups and, optionally, other hydrolyzable or condensable groups attached directly to silicon atom(s); and the crosslinking compound is a siloxane oligomer or polymer, a siloxane resin, a silica, a silicate, a siliconate, or a silicon modified organic oligomer, polymer, or resin bearing silanol groups;

(h) the organic polymer bears hydrolyzable or condensable groups directly attached to silicon atom(s) and the crosslinking compound is an organic monomer, oligomer, polymer or resin bearing active hydrogen atoms, such as in hydroxyl, ureido, mercapto, or amino groups; a silicon modified organic monomer, oligomer, polymer or resin bearing active hydrogen groups directly attached to carbon atoms or attached via —Si—C— or —Si—Y— bonds; a silane or a siloxane oligomer, polymer or resin bearing active hydrogen atoms directly attached to silicon atom(s) or attached via —C—Si or —Y—Si bonds.

The polymer in the above silicon condensation reaction schemes is selected from the group consisting of silicon modified organic polymers, mixtures of silicon modified organic polymers, mixtures of silicon modified organic polymer(s) with regular organic polymer(s), mixtures of silicon modified organic polymer(s) with siloxane polymer (s), and mixtures of above polymers with organic plasticizers or solvents. Mixtures of condensation curable silicon modified polymers with other polymers are described in Japanese Patent Nos. 55,115,446 (polyether/siloxane), 57,115,456 (polyether/siloxane), 57,145,147 (polyether/siloxane co-polymer/siloxane), 58,057,457 (polyether/polysulfide), 61,023,643 (polyether/siloxane), 63,061,076 (acrylic/polyether), and German Patent Nos. 3,009,936 (polyether/siloxane); the patents being incorporated herein by reference.

The number of reactive radicals on the polymer and the cross-linker determine, whether a cured elastomer is obtained. An elastomeric network is formed by the condensation cure, if the sum of the reactive radicals on the polymer and the reactive radicals on the cross-linker is at least 5. For example, if the polymer has two hydroxysilyl groups and the cross-linker has three condensable groups directly attached to silicon atom(s), an elastomer is obtained. An elastomer is also obtained by reacting a polymer bearing a total of four hydrolyzable groups attached to two silicon atoms with another polymer bearing two silanol groups. However, no elastomer is obtained by reacting a polymer bearing two silanol groups with a cross-linker bearing two hydrolyzable groups directly attached to silicon atom(s).

Most condensation cure chemistries require a catalyst to effect the reaction between polymer and crosslinking compound. Suitable silanol condensation catalysts are well know in the art. Examples of suitable catalysts preferably employed in the condensation reactions (a) to (g) are: (organo)metallic compounds, amino compounds, carboxylic acids, salts of amino compounds with carboxylic acids or other acids, low molecular weight polyamide resins obtained by the reaction of excess polyamines with polybasic acids, the reaction products between epoxy compounds and an excess of polyamines, or mixtures of above condensation catalysts. Specific examples of (organo)metallic compounds are the salts of a carboxylic acids, alcoholates and halides of the metals lead, zinc, zirconium, titanium, antimony, iron, cadmium, tin, barium, calcium or manganese as taught in U.S. Pat. Nos. 3,355,406, 3,706,695, 4,100,124, 4,288,356, 4,587,288, and 4,608,412, which are incorporated herein by reference. Further specific examples of (organo)metallic compounds are titanic acid esters and chelates, such as tetrabutyl titanate, tetrapropyl titanate, titanium tetraacetyl acetonate, or dibutoxytitanium bis(ethyl acetoacetate); zirconium chelates, such as zirconium tetraacetyl acetonate; organo aluminum compounds, such as aluminum trisacetyl acetonate, aluminum trisethyl acetoacetonate, or diisopropoxy aluminum ethyl acetoacetonate, etc. Specific examples of amino compounds are butyl amine, octyl amine, dibutyl amine, monoethanol amine, diethanol amine, triethanol amine, diethylene triamine, triethylene tetramine, triethylene diamine, oleyl amine, cyclohexyl amine, benzyl amine, diethylaminopropyl amine, xylylene diamine, guanidine, diphenyl guanidine, 2,4,6-tris (dimethyl aminomethyl) phenol, morpholine, N-methyl morpholine, 2-ethyl-4-methylimidazole, 1,8-diazabicyclo (5,4,0) undecene-7, aminosilanes, such as g-amino propyltrimethoxysilane or N-(b-aminoethyl)-g-aminopropylmethyldimethoxysilane. Specific examples of carboxylic acids are formic acid, acetic acid, etc.

Particularly preferred (organo)metallic catalysts are (organo)tin compounds of carboxylic acids having from 1 to 18 carbon atom(s) and (organo)tin halides, in particular organotin octoates, naphthenates, hexoates, laurates, acetates, bromides and chlorides. Specific examples of such (organo)tin compounds are tin(II)octoate, dibutyltin dilaurate, octyltin triacetate, dioctyltin dioctoate, dioctyltin diacetate, didecyltin diacetate, dibutyltin diacetate, dibutyltin dibromide, dioctyltin dilaurate, and trioctyltin acetate. Preferred compounds are tin(II)octoate and diorganotin dicarboxylates, in particular dibutyltin dilaurate, dioctyltin dilaurate, dibutyltin diacetate and dioctyltin diacetate. The catalyst may also be the product of a reaction of a tin salt, in particular of a tin dicarboxylate, with an alkoxysilane or ethyl polysilicate, as described in U.S. Pat. Nos. 3,862,919, 4,102,860, 4,137,249, 4,152,343. However, other tin catalysts can also be utilized, such as a member selected from the class consisting of stannoxanes, hydroxystannoxanes, and monoalkoxyacylstannanes. More particularly, diacylstannoxane, acylhydroxystannoxane, monomethoxyacylstannanes, dihalostannoxane or halohydroxystannoxane have been found effective. If silica is used as a reinforcing filler in the composition, divalent tin compounds are the most preferred condensation catalysts as described in U.S. Pat. No. 4,954,565. The divalent, stannous form of (organo)tin compounds does not cause a reaction between the hydroxysilyl functional organic polymer and silica as is caused when the tetravalent, stannic form of (organo)tin compounds are used as catalysts. The preferred stannous catalyst is stannous octoate (stannous bis(2-ethylhexanoate). Use of co-catalysts, as described above, for example, amino compounds or carboxylic acids, such as acetic acid, with tetravalent tin compounds, for example, dibutyltin diacetate, allows for a significant reduction of the (organo)tin catalyst level.

When said condensation catalysts are used, they are added in an amount preferably of from 0.01 to 20 weight parts, more preferably from 0.1 to 5 weight parts, per 100 weight parts of the silicon modified organic polymer.

The cross-linker(s) or cure by-product(s) of certain condensation cure systems can act as catalyst or co-catalyst to other condensation cure systems. Examples of such co-catalysis are a mixture of silazane cross-linker and oximosilane cross-linker or a silane cross-linker which bears both amino and oximo functionalities, as described in U.S. Pat. No. 3,742,004, 3,758,441 and 4,191,817. Both systems are capable of crosslinking hydroxysiloxy functional organic polymer without the presence of a further catalyst. Another example is a silane bearing both amino and alkoxy functionalities, such as in $CH_3(C_2H_5O)Si(NHCH_2CH_2CH_2Si(OC_2H_5)_3)_2$, disclosed in U.S. Pat. No. 4,458,055, incorporated herein by reference. Another example of such co-catalysis is the condensation reaction between an alkoxysilane and a hydroxysiloxy functional organic polymer, or between two alkoxysiloxy functional organic polymers, catalyzed by an acetoxysilane cross-linker in presence of a primary tin condensation catalyst, as described in U.S. Pat. Nos. 3,293,204 and 4,515,932, as well as in "Bifunctional catalysis in the condensation of silanols and alkoxysilanes" by Hsien-Kun Chu, Robert P. Cross, and David I. Crossan in *Journal of Organometallic Chemistry*, 425 (1992), pages 9–17. Combining various condensation cure chemistries, thus, may be advantageous.

Certain condensation cure chemistries do not require an external catalyst. In these cure chemistries, the crosslinking compound and/or the leaving group itself catalyzes the condensation reaction. Examples of self-catalytic leaving groups are acetoxy (—OC(O)CH$_3$), oximo (—O—N=CR$_2$), aminoxy (—ONR$_2$), amine (—NR$_2$). The catalysis of the condensation reaction between two silanol groups by carboxylic acids, hydroxylamines, oximes, and amines has been described by Hsien-Kun Chu, Robert P. Cross, and David I. Crossan in *Journal of Organo—metallic Chemistry*, 425 (1992), pages 9–17. Self-catalytic leaving groups are effective in catalyzing condensation reactions regardless whether they are attached to a silane, a siloxane, or a silicon modified organic polymer. For example, a silicon modified organic polymer terminated with hydroxylsilyl groups at both ends will cure to an elastomer when mixed with vinyltriacetoxy silane cross-linker and exposed to moisture in the absence of an external catalyst. As a further example, a silicon modified organic polymer terminated with bis (cyclohexylamino)methylsilyl groups at both ends will cure to an elastomer when exposed to moisture.

Further compounds suitable for catalyzing condensation reactions (d) to (h) are group VIII transition metal (noble metal) compounds. The noble metal catalyst is selected from any of those well known to the art, such as those described in U.S. Pat. No. 3,923,705, said patent being hereby incorporated by reference to show platinum catalysts. A preferred platinum compound catalyst is a composition consisting essentially of the reaction product of chloroplatinic acid and an organosilicon compound containing terminal aliphatic unsaturation, such as described in U.S. Pat. No. 3,419,593, said patent being incorporated by reference. When said noble metal catalysts are used, they are added in an amount preferably of from 0.000001 to 0.5 weight parts, more preferably from 0.00001 to 0.002 weight parts, per 100 weight parts of the silicon modified organic polymer.

Examples of suitable condensation cure chemistries are as follows:

(a1) For example, in one condensation cure system useful in the present invention, the organic polymer has hydroxyl, condensable, or hydrolyzable group(s) attached to silicon atom(s), and the cross-linker has silicon-hydrogen bond(s). The silicon modified organic polymer and the cross-linker are reacted in the presence of a condensation catalyst, as disclosed and described in U.S. Pat. Nos. 4,310,678, 4,782,112, 4,962,153, and 4,978,710, Japanese Patent Nos. 58,057,457 and 58,057,458, and European Patent No. 0,255,440, which are incorporated herein by reference. The silicon hydride cross-linker can be chosen from hydrolyzable silicon hydride, polymeric or oligomeric compounds, containing hydrogen and optionally hydrolyzable or condensable groups bound directly to silicon atom(s), such as polyorganohydrogensiloxane, alkylhydrogencyclosiloxane, and liquid copolymers comprising SiO$_2$ and/or SiO$_{3/2}$ units and bearing silicon-bonded hydrogen radicals such as taught in U.S. Pat. No. 4,310,678, or organic oligomers, polymers or resins containing Si—H groups and optionally other hydrolyzable or condensable silyl groups directly bound to carbon atom(s) via Si—Y bonds. The cross-linker may also be a silsesquioxane containing hydrogen and optionally also alkoxy groups bound directly to silicon atoms, as described, for example, in U.S. Pat. No. 5,047,492, incorporated herein by reference. The hydrolyzable silicon hydride should have at least one, but not more than three hydrogen atoms bonded to silicon per molecule. It may have one or two hydrolyzable atoms or groups, such as alkoxy, bonded to silicon per molecule, such as methyldiethoxysilane. Examples of cross-linkers are trimethylsilyl endblocked polymethylhydrogensiloxane and methylhydrogencyclosiloxane. The SiH functional cross-linker is added in sufficient amount to provide at least one hydrogen atom for each Si—X group (e.g. hydroxysilyl or alkoxysilyl group) in the polymer. Preferably, an excess of SiH functional cross-linker is provided so that all Si—X groups can be reacted. Suitable condensation cure catalysts are exemplified by, but not limited to, noble metal complexes, organic acid metal salts, amino compounds and their salts, and mixtures of condensation catalysts. In a typical preparation, a noble metal catalyst would be present in the composition in an amount of from 0.000001 to 0.5 parts, preferably from 0.00001 to 0.02, and more preferably from 0.00001 to 0.002 parts by weight, an organic acid metal salt, titanic ester or amino compound would be present in the composition in an amount of from 0.01 to 10 parts by weight and preferably 0.05 to 5 parts by weight, the SiH functional cross-linker would be present in an amount of from 0.1 to 10 parts by weight per 100 parts by weight of Si—X terminated organic polymer.

(a2) As an alternative to the (a1) cure system, the organic polymer having at least two silicon-hydrogen bonds can be reacted in the presence of a condensation catalyst with a cross-linker having, on average, more than two (2.0) hydroxyl or more than two (2.0) condensable or hydrolyzable groups attached directly to silicon atom(s). In a typical preparation, the catalyst would be present in the composition in the same amount as described above, and cross-linker, depending on the type of cross-linker utilized, in an amount of from 0.1 to 50 parts by weight per 100 weight parts of silicon-hydrogen terminated polymer.

(b1) In another condensation cure system useful in the present invention, the organic polymer has at least two hydroxysilyl groups linked to the polymer via Si—C or Si—Y bonds, and the cross-linker has, on average, more than two (2.0) hydrolyzable OR' groups bonded to silicon atom(s), where R' can be a monovalent alkyl, substituted alkyl, alkyl ether, aryl, substituted aryl, or aryl ether radical. The silicon modified organic polymer and the cross-linker are reacted in the presence of a condensation catalyst, as disclosed and described in Japanese Patent Nos. 55,082,123 and 55,115,446, which are incorporated herein by reference. The condensation catalyst employed in this cure system is preferably an (organo)metallic compound, an amino compound, a carboxylic acid, a salt of an amino compound, or a mixture of condensation catalysts. The cross-linker can be a silane of the formula R$_x$SiX$_{4-x}$, where x is either 0 or 1, R can be hydrogen, a monovalent hydrocarbon radical or substituted hydrocarbon radical having less than 7 carbon atoms, such as an alkyl or alkenyl radical, a halogenated hydrocarbon, an aryl radical, a functionalized hydrocarbon radical, X is OR', where R' can be a monovalent alkyl, substituted alkyl, alkyl ether, aryl, substituted aryl, or aryl ether radical. Suitable silanes include ethylorthosilicate, normal propylorthosilicate, mercaptopropyltrimethoxysilane, methyltrimethoxysilane, phenyltrimethoxysilane, chloropropyltrimethoxysilane, amyltriethoxysilane, g-glycidoxypropyltrimethoxysilane, trifluoropropyltrimethoxysilane, ethyltrimethoxysilane, triethoxysilane, vinyltrimethoxysilane, ethyltris (ethoxyethoxy)silane, and methyltrisphenoxysilane. The cross-linker can also be a silsesquinoxane containing OR' groups bound directly to silicon atoms, as described, for example, in U.S. Pat. No. 5,047,492, incorporated herein by reference. The cross-linker may also be a linear or cyclic siloxane oligomer containing OR' groups, or an organic oligomer, polymer or resin bearing SiOR' groups bound to the polymer via Si—C or Si—Y bonds. The cross-linker may also be the partial hydrolysis and condensation product (dimer, trimer, tetramer, etc.) of above cross-linkers. In a typical preparation, the condensation catalyst would be present in the composition in an amount of from 0.01 to 10 parts, preferably in an amount of from 0.05 to 5 parts, and cross-linker would be present in an amount of from 0.1 to 50 parts, preferably in an amount from 1 to 10 parts, each by weight, based on 100 parts by weight of silicon modified organic polymer.

(b2) In an alternative to the (b1) cure system, the organic polymer has at least two hydrolyzable OR' groups and, optionally, other hydrolyzable or condensable group(s) other than OR' bound to silicon atom(s). The polymer is then reacted in the presence of a condensation catalyst as described above with a cross-linker having hydroxyl groups bound to silicon atoms, as disclosed and described in Japanese Patent Nos. 55,060,557, 58,057,458, 63,063,750, and 02,196,842, and European Patent No. 0,396,914, which are incorporated herein by reference. If the organic polymer bears only two hydrolyzable OR' groups and no further hydrolyzable groups, the cross-linker must have, on average, more than two (2.0) hydroxyl groups. If the organic polymer bears more than two hydrolyzable groups, the cross-linker must have, on average, at least two hydroxyl groups. The hydrolyzable groups may be attached to the same or different silicon atoms. In a typical preparation, the catalyst would be present in the composition in an amount from 0.01 to 10 parts, preferably in an amount from 0.01 to 5 parts, and the cross-linker, depending on its nature, would be present in an amount of from 0.1 to 50 parts, preferably in an amount from 1 to 10 parts, each by weight, based on 100 parts by weight of silicon modified organic polymer.

(b3) As a further alternative to the (b1) cure system, the organic polymer having at least two hydrolyzable OR' group(s) and, optionally, other hydrolyzable or condensable group(s) other than OR' bound to different silicon atoms; can be crosslinked in the presence of a condensation catalyst as described above. This reaction is disclosed and described in Japanese Patent Nos. 54,006,097, 54,036,397, 58,017,154, 58,042,619, 75,150,955, 03,210,367, and 05,132,616, U.S. Pat. No. 3,971,751, and European Patent Nos. 0,353,551 and 0,354,014, which are incorporated herein by reference. In case the polymer has only two hydrolyzable OR' groups and no further hydrolyzable group(s) attached to different silicon atoms, the presence of a cross-linker, which, on average, has more than two (2.0) hydrolyzable groups bonded to silicon atom(s), is required. In case the polymer has more than two hydrolyzable OR' groups or two OR' and further hydrolyzable group(s) attached to different silicon atoms, the presence of a cross-linker is not required. In a typical preparation, the catalyst would be present in the composition in an amount from 0.01 to 10 parts, preferably in an amount from 0.01 to 5 parts, and the additional cross-linker, if required, would be present in an amount of from 0.1 to 20 parts, preferably in an amount from 0.1 to 10 parts, each by weight, based on 100 parts by weight of silicon modified organic polymer.

(c1) In another condensation cure system useful to the practice of the present invention, the organic polymer has at least two hydroxysilyl groups, linked to the polymer via Si—C or Si—Y bonds, and the cross-linker has, on average, more than two (2.0) hydrolyzable acyloxy groups bonded to silicon atom(s). The silicon modified organic polymer and the cross-linker are reacted, optionally in the presence of a condensation catalyst, selected from the group consisting of (organo)metallic compounds, amino compounds, carboxylic acids, salts of amino compounds, or mixtures of condensation catalysts. The reaction is disclosed and described in Japanese Patent Nos. 55,082,123 and 55,115,446, which are incorporated herein by reference. The cross-linker can be an acyloxy silane of the formula $R_xSi(OOCR')_{4-x}$, where x is either 0 or 1, R can be hydrogen, a monovalent hydrocarbon radical or substituted hydrocarbon radical having less than 7 carbon atoms, such as an alkyl or alkenyl radical, a halogenated hydrocarbon, an aryl radical, a functionalized hydrocarbon radical, and R' can be hydrogen or monovalent hydrogencarbon radical having less than 7 carbon atoms. Examples of suitable acyloxysilane cross-linkers include methyltriacetoxysilane, ethyltriacetoxysilane, phenyl triacetoxysilane, ethyltriacetoxysilane, phenyltriacetoxysilane, and methyl tris(benzoyloxy)silane. A preferred acyloxysilane is vinyltriacetoxysilane. The acyloxysilane may also be pre-reacted with a siloxane, such as $(CH_3)_3SiO(CH_3HSiO)_x((CH_3COO)_3SiCH_2CH_2SiCH_3O)_ySi(CH_3)_3$, as disclosed in German Patent No. 2,316,184, incorporated herein by reference. The cross-linker may also be a linear or cyclic siloxane oligomer containing acyloxysiloxy groups. The cross-linker may also be a silsesquioxane containing acyloxy groups bound directly to silicon atom(s), an organic oligomer, polymer or resin bearing acyloxysilyl groups and, optionally, other hydrolyzable or condensable groups bound to carbon atom(s) via Si—C or Si—Y bonds. The cross-linker may also be a partial hydrolysis and condensation product (dimer, trimer, tetramer, etc.) of above cross-linkers. In a typical preparation, the optional catalyst would be present in the composition in an amount of from 0 to 10 parts, preferably in an amount of from 0 to 5 parts, and the cross-linker would be present in an amount of from 0.1 to 50 parts, preferably in an amount from 1 to 10 parts, each by weight, based on 100 parts by weight of silicon modified organic polymer.

(c2) In an alternative to the (c1) cure system, the organic polymer has at least two hydrolyzable acyloxy and, optionally, other hydrolyzable or condensable group(s) other than acyloxy bound to silicon atom(s). The polymer is then reacted, optionally in the presence of a condensation catalyst as described above, with a cross-linker having hydroxyl groups bound to silicon atoms, as disclosed and described in Japanese Patent Nos. 58,057,458 and 02,196,842, which are incorporated herein by reference. If the organic polymer bears only two hydrolyzable acyloxy groups and no further hydrolyzable groups, the cross-linker must have, on average, more than two (2.0) hydroxyl groups. If the organic polymer bears more than two hydrolyzable groups, the cross-linker must have, on average, at least two hydroxyl groups. The hydrolyzable groups may be attached to the same or different silicon atoms. In a typical preparation, the optional catalyst would be present in the composition in an amount from 0 to 10 parts, preferably in an amount from 0 to 5 parts, and the cross-linker, depending on its nature, would be present in an amount of from 0.1 to 50 parts, preferably in an amount from 1 to 10 parts, each by weight, based on 100 parts by weight of silicon modified organic polymer.

(c3) As a further alternative to the (c1) cure system, organic polymer having at least two hydrolyzable acyloxy group(s) and, optionally, other hydrolyzable or condensable group(s) other than acyloxy bound to different silicon atoms; can be crosslinked, optionally, in the presence of a condensation catalyst as described above. The reaction is disclosed and described in Japanese Patent Nos. 54,006,097, 54,036, 397, 57,115,456, and 75,150,955, and U.S. Pat. Nos. 3,441, 534, 3,448,072, 3,971,751, which are incorporated herein by reference. In case the polymer has only two hydrolyzable acyloxy groups and no further hydrolyzable group(s) attached to different silicon atoms, the presence of a cross-linker, which, on average, has more than two (2.0) hydrolyzable groups bonded to silicon atom(s), is required. In case the polymer has more than two hydrolyzable acyloxy groups or two acyloxy and further hydrolyzable group(s) attached to different silicon atoms, the presence of a cross-linker is not required. In a typical preparation, the optional catalyst would be present in the composition in an amount from 0 to 10 parts, preferably in an amount from 0 to 5 parts, and the additional cross-linker, if required, would be present in an amount of from 0.1 to 20 parts, preferably in an amount from 0.1 to 10 parts, each by weight, based on 100 parts by weight of silicon modified organic polymer.

(d1) In another condensation cure system useful to the practice of the present invention, the organic polymer has at least two hydroxysilyl groups linked to the polymer via Si—C or Si—Y bonds, and the cross-linker has, on average, more than two (2.0) hydrolyzable oximo groups bonded to silicon atom(s). The silicon modified organic polymer and the cross-linker are reacted, optionally in the presence of a condensation catalyst, selected from the group consisting of (organo)metallic compounds, amino compounds, carboxylic acids, salts of amino compounds, or mixtures of condensation catalysts. The cure system is described in detail in U.S. Pat. Nos. 4,618,642 and 4,954,565, and Japanese Patent Nos. 55,082,123 and 55,115,446, which are incorporated herein by reference. The cross-linker can be an oximo silane of the formula $R_xSi(O-N=C(R'R''))_{4-x}$, where x is either 0 or 1, and R can be hydrogen, a monovalent hydrocarbon radical or substituted hydrocarbon radical having less than 7 carbon atoms, such as an alkyl or alkenyl radical, a halogenated hydrocarbon, an aryl radical, a functionalized hydrocarbon radical, and R' and R" are individually selected from the group consisting of hydrogen or monovalent hydrogen radical having less than 7 carbon atoms. Examples of suitable oximosilane cross-linkers include methyltris (methylethlketoximo)silane, methyltris(dimethylketoximo) silane, methyltris(diethylketoximo)silane, vinyltris (methylethyl-ketoximo)silane, vinyltris (methylisobutylketoximo)silane, tetra (methylisobutylketoximo)silane. The cross-linker may also be an oximosilane of the formula $R^4{}_a(R^3SiO)_bSi(ONCR^1R^2)_{4-(a+b)}$ with $R^1$, $R^2$, $R^3$ and $R^4$ independently selected from the group consisting of 1–8 carbon alkyl or fluoroalkyl, 5–6 carbon cycloalk(en)yl, 2–8 carbon alkenyl or aryl, and a is either 0 or 1, and b is either 1 or 2, as disclosed in German Patent No. 3,903,337, incorporated herein by reference. The cross-linker may also be a linear or cyclic siloxane oligomer containing oximosiloxy groups, a silsesquioxane containing oximo and, optionally, other hydrolyzable or condensable groups bound directly to silicon atoms, an organic oligomer, polymer or resin bearing oximosilyl groups and, optionally, other hydrolyzable or condensable silyl groups bound to carbon atom(s) via Si—C or Si—Y bonds. The cross-linker may also be a partial hydrolysis and condensation product (dimer, trimer, tetramer, etc.) of above cross-linkers. In a typical preparation the optional catalyst would be present in the composition in an amount of from 0 to 10 parts, preferably in an amount of from 0 to 5 parts, and the cross-linker would be present in an amount of from 0.1 to 50 parts, preferably in an amount from 1 to 10 parts, each by weight, based on 100 parts by weight of silicon modified organic polymer.

(d2) In an alternative to the (d1) cure system, the organic polymer has at least two hydrolyzable oximo and, optionally, other hydrolyzable or condensable group(s) other than oximo bound to silicon atom(s). The polymer is then reacted, optionally in the presence of a condensation catalyst as described above, with a cross-linker having hydroxyl groups bound to silicon atoms, as disclosed and described in Japanese Patent Nos. 58,057,458 and 02,196,842, which are incorporated herein by reference. If the organic polymer bears only two hydrolyzable oximo groups and no further hydrolyzable groups, the cross-linker must have, on average, more than two (2.0) hydroxyl groups. If the organic polymer bears more than two hydrolyzable groups, the cross-linker must have, on average, at least two hydroxyl groups. The hydrolyzable groups may be attached to the same or different silicon atoms. In a typical preparation, the optional catalyst would be present in the composition in an amount from 0 to 10 parts, preferably in an amount from 0 to 5 parts, and the cross-linker, depending on its nature, would be present in an amount of from 0.1 to 50 parts, preferably in an amount from 1 to 10 parts, each by weight, based on 100 parts by weight of silicon modified organic polymer.

(d3) As a further alternative to the (d1) cure system, organic polymer having at least two hydrolyzable oximo group(s) and, optionally, other hydrolyzable or condensable group(s) other than oximo bound to different silicon atoms; can be crosslinked, optionally, in the presence of a condensation catalyst as described above. The reaction is disclosed and described in Japanese Patent Nos. 54,006,097, 54,036, 397, 57,115,456, and 75,150,955, and U.S. Pat. No. 3,971, 751, which are incorporated herein by reference. In case the polymer has only two hydrolyzable oximo groups and no further hydrolyzable group(s) attached to different silicon atoms, the presence of a cross-linker, which, on average, has more than two (2.0) hydrolyzable groups bonded to silicon atom(s), is required. In case the polymer has more than two hydrolyzable oximo groups or two oximo and further hydrolyzable group(s) attached to different silicon atoms, the presence of a cross-linker is not required. In a typical preparation, the optional catalyst would be present in the composition in an amount from 0 to 10 parts, preferably in an amount from 0 to 5 parts, and the additional cross-linker, if required, would be present in an amount of from 0.1 to 20 parts, preferably in an amount from 0.1 to 10 parts, each by weight, based on 100 parts by weight of silicon modified organic polymer.

(e1) In another condensation cure system useful to the practice of the present invention, the organic polymer has at least two hydroxysilyl groups linked to the polymer via Si—C or Si—Y bonds, and the cross-linker has, on average, more than two (2.0) hydrolyzable amino groups bonded to silicon atom(s). The silicon modified organic polymer and the cross-linker are reacted, optionally in the presence of a condensation catalyst, selected from the group consisting of (organo)metallic compounds, amino compounds, carboxylic acids, salts of amino compounds, or mixtures of condensation catalysts. The reaction is disclosed and described in Japanese Patent Nos. 55,082,123 and 55,115,446, which are incorporated herein by reference. The cross-linker can be an amino silane of the formula $(R_nSi(NR'_2)_{4-n})$, as described in U.S. Pat. Nos. 3,032,528, 3,338,868, 3,464,951, and 3,408, 325, incorporated herein by reference, where R is hydrogen, monovalent hydrocarbon radical or substituted hydrocarbon radical having less than 7 carbon atoms, functionalized hydrocarbon radicals, nitrogen compounds of the formula —N=CR'$_2$ or —NR'COR' or —NR'$_2$ or —NR", where R' is either hydrogen, a monovalent hydrocarbon or substituted hydrocarbon radical, R" is cycloalkyl radical, and n is either 0 or 1. A preferred cross-linker is methyltris (cyclohexylamine)silane. The cross-linker may also be a linear or cyclic siloxane oligomer containing aminosiloxy groups, a silsesquioxane containing amino and, optionally, other hydrolyzable or condensable groups bound directly to silicon atoms, a organic oligomer, polymer or resin bearing aminosilyl groups and, optionally, other hydrolyzable or condensable silyl groups bound to carbon atom(s) via Si—C or Si—Y bonds. The cross-linker may also be a partial hydrolysis and condensation product (dimer, trimer, tetramer, etc.) of above cross-linkers. In a typical preparation, the optional catalyst would be present in the composition in an amount of from 0 to 10 parts, preferably in an amount of from 0 to 5 parts, and the cross-linker would be present in an amount of from 0.1 to 50 parts, preferably in an amount from 1 to 10 parts, each by weight, based on 100 parts by weight of silicon modified organic polymer.

(e2) In an alternative to the (e1) cure system, the organic polymer has at least two hydrolyzable amino and, optionally, other hydrolyzable or condensable group(s) other than amino bound to silicon atom(s). The polymer is then reacted, optionally in the presence of a condensation catalyst as described above, with a cross-linker having hydroxyl groups bound to silicon atoms, as disclosed and described in Japanese Patent Nos. 58,057,458 and 02,196,842, which are incorporated herein by reference. If the organic polymer bears only two hydrolyzable amino groups and no further hydrolyzable groups, the cross-linker must have, on average, more than two (2.0) hydroxyl groups. If the organic polymer bears more than two hydrolyzable groups, the cross-linker must have, on average, at least two hydroxyl groups. The hydrolyzable groups may be attached to the same or different silicon atoms. In a typical preparation, the optional catalyst would be present in the composition in an amount from 0 to 10 parts, preferably in an amount from 0 to 5 parts, and the cross-linker, depending on its nature, would be present in an amount of from 0.1 to 50 parts, preferably in an amount from 1 to 10 parts, each by weight, based on 100 parts by weight of silicon modified organic polymer.

(e3) As a further alternative to the (e1) cure system, organic polymer having at least two hydrolyzable amino group(s) and, optionally, other hydrolyzable or condensable group(s) other than amino bound to different silicon atoms; can be crosslinked, optionally, in the presence of a condensation catalyst as described above. The reaction is disclosed and described in Japanese Patent Nos. 54,006,097, 54,036, 397, 57,115,456, and 75,150,955, and U.S. Pat. No. 3,971, 751, which are incorporated herein by reference. In case the polymer has only two hydrolyzable amino groups and no further hydrolyzable group(s) attached to different silicon atoms, the presence of a cross-linker, which, on average, has more than two (2.0) hydrolyzable groups bonded to silicon atom(s), is required. In case the polymer has more than two hydrolyzable amino groups or two amino and further hydrolyzable group(s) attached to different silicon atoms, the presence of a cross-linker is not required. In a typical preparation, the optional catalyst would be present in the composition in an amount from 0 to 10 parts, preferably in an amount from 0 to 5 parts, and the additional cross-linker, if required, would be present in an amount of from 0.1 to 20 parts, preferably in an amount from 0.1 to 10 parts, each by weight, based on 100 parts by weight of silicon modified organic polymer.

(f1) In another condensation cure system useful to the practice of the present invention, the organic polymer has at least two hydroxysilyl groups linked to the polymer via Si—C or Si—Y bonds, and the cross-linker has, on average, more than two (2.0) hydrolyzable aminoxy groups bonded to silicon atom(s). The silicon modified organic polymer and the cross-linker are reacted, optionally in the presence of a condensation catalyst, selected from the group consisting of (organo)metallic compounds, amino compounds, carboxylic acids, salts of amino compounds, or mixtures of condensation catalysts. The reaction is disclosed and described in Japanese Patent Nos. 55,082,123 and 55,115,446, which are incorporated herein by reference. The cross-linker can be an aminoxy silane of the formula $R_nSi(ONR'R'')_{4-n}$, a linear aminoxysiloxane of the formula $(R_3SiO(SiR_2O)_a(SiRXO)_bSiR_3)$, a cyclic aminoxysiloxane (mixture of cyclic siloxanes containing $(R_2SiO)$ and $(RXSiO)$ units), as described in U.S. Pat. Nos. 3,441,583, 3,484,471, 3,528,941, 3,817,909, 3,839,386, 4,075,154, and Japanese Patent No. 7 6,019,728, and German Patent No. 2,640,328, incorporated herein by reference, where X is ONR'R'', R is individually selected from the group consisting of hydrogen, monovalent hydrocarbon radical or substituted hydrocarbon radical having less than 7 carbon atoms, functionalized hydrocarbon radicals, nitrogen compounds of the formula $-N=CR'_2$ or $-NR'COR'$ or $-NR'_2$ or $-NR'''$, where R' and R'' are either hydrogen or monovalent hydrocarbon radicals having less than 7 carbon atoms, and R''' is cycloalkyl radical, and n is either 0 or 1, and a is 0 or a positive integer, and b is an integer greater than 2. The cross-linker can also be a silsesquioxane containing aminoxy and, optionally, other hydrolyzable or condensable groups bound directly to silicon atom(s), an organic oligomer, polymer or resin bearing aminoxysilyl groups and, optionally, other hydrolyzable or condensable silyl groups bound to carbon atom(s) via Si—C or Si—Y bonds. The cross-linker can also be a partial hydrolysis and condensation product (dimer, trimer, tetramer, etc.) of above cross-linkers. In a typical preparation, the optional catalyst would be present in the composition in an amount of from 0 to 10 parts, preferably in an amount of from 0 to 5 parts, and the cross-linker would be present in an amount of from 0.1 to 50 parts, preferably in an amount from 1 to 10 parts, each by weight, based on 100 parts by weight of silicon modified organic polymer.

(f2) In an alternative to the (f1) cure system, the organic polymer has at least two hydrolyzable aminoxy and, optionally, other hydrolyzable or condensable group(s) other than aminoxy bound to silicon atom(s). The polymer is then reacted, optionally in the presence of a condensation catalyst as described above, with a cross-linker having hydroxyl groups bound to silicon atoms, as disclosed and described in Japanese Patent Nos. 58,057,458 and 02,196,842, which are incorporated herein by reference. If the organic polymer bears only two hydrolyzable aminoxy groups and no further hydrolyzable groups, the cross-linker must have, on average, more than two (2.0) hydroxyl groups. If the organic polymer bears more than two hydrolyzable groups, the cross-linker must have, on average, at least two hydroxyl groups. The hydrolyzable groups may be attached to the same or different silicon atoms. In a typical preparation, the optional catalyst would be present in the composition in an amount from 0 to 10 parts, preferably in an amount from 0 to 5 parts, and the cross-linker, depending on its nature, would be present in an amount of from 0.1 to 50 parts, preferably in an amount from 1 to 10 parts, each by weight, based on 100 parts by weight of silicon modified organic polymer.

(f3) As a further alternative to the (f1) cure system, organic polymer having at least two hydrolyzable aminoxy group(s) and, optionally, other hydrolyzable or condensable group(s) other than aminoxy bound to different silicon atoms; can be crosslinked, optionally, in the presence of a condensation catalyst as described above. The reaction is disclosed and described in Japanese Patent Nos. 54,006,097, 54,036,397, 57,115,456, and 75,150,955, and U.S. Pat. No. 3,971,751, which are incorporated herein by reference. In case the polymer has only two hydrolyzable aminoxy groups and no further hydrolyzable group(s) attached to different silicon atoms, the presence of a cross-linker, which, on average, has more than two (2.0) hydrolyzable groups bonded to silicon atom(s), is required. In case the polymer has more than two hydrolyzable aminoxy groups or two aminoxy and further hydrolyzable group(s) attached to different silicon atoms, the presence of a cross-linker is not required. In a typical preparation, the optional catalyst would be present in the composition in an amount from 0 to 10 parts, preferably in an amount from 0 to 5 parts, and the additional cross-linker, if required, would be present in an amount of from 0.1 to 20 parts, preferably in an amount from 0.1 to 10 parts, each by weight, based on 100 parts by weight of silicon modified organic polymer.

(g1) In another condensation cure system useful to the practice of the present invention, the organic polymer has at least two hydroxysilyl groups linked to the polymer via Si—C or Si—Y bonds, and the cross-linker has, on average, more than two (2.0) hydrolyzable amido groups bonded to silicon atom(s). The silicon modified organic polymer and the cross-linker are reacted, optionally in the presence of a condensation catalyst, selected from the group consisting of (organo)metallic compounds, amino compounds, carboxylic acids, salts of amino compounds, or mixtures of condensation catalysts. The reaction is disclosed and described in Japanese Patent Nos. 55,082,123 and 55,115,446, which are incorporated herein by reference. The cross-linker can be an amidosilane cross-linker $(R_nSi(OR')_m(NR''—(CO)—R''')_{4-(n+m)})$, where R and R'' are individually selected from the group consisting of hydrogen, monovalent hydrocarbon radical or substituted hydrocarbon radical having less than 7 carbon atoms, functionalized hydrocarbon radicals, nitrogen compounds of the formula —N=CR'$_2$ or —NR'COR' or —NR'$_2$ or —NR'', and R' is either hydrogen or monovalent hydrocarbon radicals having less than 7 carbon atoms, and R''' is monovalent aliphatic or aromatic hydrocarbon radical or substituted hydrocarbon radical having less than 7 carbon atoms, functionalized hydrocarbon radical, with n either 0 or 1, and m either 0, 1 or 2, as described, for example, in U.S. Pat. Nos. 3,378,520 and 4,985,476. Examples of preferred cross-linkers are methyltris(acetamido)silane and methylethoxybis-(N-methylbenzamido) silane. The cross-linker may also be a linear or cyclic siloxane oligomer containing amidosiloxy groups. The cross-linker may also be a silsesquioxane containing amido and, optionally, other hydrolyzable or condensable groups bound directly to silicon atoms, an organic oligomer, polymer or resin bearing amidosilyl groups and, optionally, other hydrolyzable or condensable groups bound to carbon atom(s) via Si—C or Si—Y bonds. The cross-linker may also be a partial hydrolysis and condensation product (dimer, trimer, tetramer, etc.) of above cross-linkers. In a typical preparation, the optional catalyst would be present in the composition in an amount of from 0 to 10 parts, preferably in an amount of from 0 to 5 parts, and the cross-linker would be present in an amount of from 0.1 to 50 parts, preferably in an amount from 1 to 10 parts, each by weight, based on 100 parts by weight of silicon modified organic polymer.

(g2) In an alternative to the (g1) cure system, the organic polymer has at least two hydrolyzable amido and, optionally, other hydrolyzable or condensable group(s) other than amido bound to silicon atom(s). The polymer is then reacted, optionally in the presence of a condensation catalyst as described above, with a cross-linker having hydroxyl groups bound to silicon atoms as disclosed and described in Japanese Patent Nos. 58,057,458 and 02,196,842, which are incorporated herein by reference. If the organic polymer bears only two hydrolyzable amido groups and no further hydrolyzable groups, the cross-linker must have, on average, more than two (2.0) hydroxyl groups. If the organic polymer bears more than two hydrolyzable groups, the cross-linker must have, on average, at least two hydroxyl groups. The hydrolyzable groups may be attached to the same or different silicon atoms. In a typical preparation, the optional catalyst would be present in the composition in an amount from 0 to 10 parts, preferably in an amount from 0 to 5 parts, and the cross-linker, depending on its nature, would be present in an amount of from 0.1 to 50 parts, preferably in an amount from 1 to 10 parts, each by weight, based on 100 parts by weight of silicon modified organic polymer.

(g3) As a further alternative to the (g1) cure system, organic polymer having at least two hydrolyzable amido group(s) and, optionally, other hydrolyzable or condensable group(s) other than amido bound to different silicon atoms; can be crosslinked, optionally, in the presence of a condensation catalyst as described above. The reaction is disclosed and described in Japanese Patent Nos. 54,006,097, 54,036, 397, 57,115,456, and 75,150,955, and U.S. Pat. No. 3,971, 751, which are incorporated herein by reference. In case the polymer has only two hydrolyzable amido groups and no further hydrolyzable group(s) attached to different silicon atoms, the presence of a cross-linker, which, on average, has more than two (2.0) hydrolyzable groups bonded to silicon atom(s), is required. In case the polymer has more than two hydrolyzable amido groups or two amido and further hydrolyzable group(s) attached to different silicon atoms, the presence of a cross-linker is not required. In a typical preparation, the optional catalyst would be present in the composition in an amount from 0 to 10 parts, preferably in an amount from 0 to 5 parts, and the additional cross-linker, if required, would be present in an amount of from 0.1 to 20 parts, preferably in an amount from 0.1 to 10 parts, each by weight, based on 100 parts by weight of silicon modified organic polymer.

(h1) In another condensation cure system useful to the practice of the present invention, the organic polymer has at least two hydroxysilyl groups linked to the polymer via Si—C or Si—Y bonds, and the cross-linker has, on average, more than two (2.0) hydrolyzable ureido groups bonded to silicon atom(s). The silicon modified organic polymer and the cross-linker are reacted, optionally in the presence of a condensation catalyst, selected from the group consisting of (organo)metallic compounds, amino compounds, carboxylic acids, salts of amino compounds, or mixtures of condensation catalysts. The cross-linker can be an ureido organosilane $(R_nSi(NR'—(CO)—NR''_2)_{4-n})$, where R, R' and R'' are individually selected from the group consisting of hydrogen, monovalent hydrocarbon radical or substituted hydrocarbon radical having less than 7 carbon atoms, functionalized hydrocarbon radicals, and n either 0 or 1, as described, for example, in U.S. Pat. Nos. 3,506,701, incorporated herein by reference. The cross-linker may also be a linear or cyclic siloxane oligomer containing ureidosiloxy groups, a silsesquioxane containing ureido and, optionally, other hydrolyzable or condensable groups bound directly to silicon atoms, an organic oligomer, polymer or resin bearing ureidosilyl groups and, optionally, other hydrolyzable or condensable silyl groups bound directly to carbon atom(s) via Si—Y bonds. The cross-linker can also be a partial hydrolysis and condensation product (dimer, trimer, tetramer, etc.) of above cross-linkers. In a typical preparation, the optional catalyst would be present in the composition in an amount of from 0 to 10 parts, preferably in an amount of from 0 to 5 parts, and the cross-linker would be present in an amount of from 0.1 to 50 parts, preferably in an amount from 1 to 10 parts, each by weight, based on 100 parts by weight of silicon modified organic polymer.

(h2) In an alternative to the (h1) cure system, the organic polymer has at least two hydrolyzable ureido and, optionally, other hydrolyzable or condensable group(s) other than ureido bound to silicon atom(s). The polymer is then reacted, optionally in the presence of a condensation catalyst as described above, with a cross-linker having hydroxyl groups bound to silicon atoms. If the organic polymer bears only two hydrolyzable ureido groups and no further hydrolyzable groups, the cross-linker must have, on average, more than two (2.0) hydroxyl groups. If the organic polymer bears more than two hydrolyzable groups, the cross-linker must have, on average, at least two hydroxyl groups. The hydrolyzable groups may be attached to the same or different silicon atoms. In a typical preparation, the optional catalyst would be present in the composition in an amount from 0 to 10 parts, preferably in an amount from 0 to 5 parts, and the cross-linker, depending on its nature, would be present in an amount of from 0.1 to 50 parts, preferably in an amount from 1 to 10 parts, each by weight, based on 100 parts by weight of silicon modified organic polymer.

(h3) As a further alternative to the (h1) cure system, organic polymer having at least two hydrolyzable ureido group(s) and, optionally, other hydrolyzable or condensable group(s) other than ureido bound to different silicon atoms; can be crosslinked, optionally, in the presence of a condensation catalyst as described above. In case the polymer has only two hydrolyzable ureido groups and no further hydrolyzable group(s) attached to different silicon atoms, the presence of a cross-linker, which, on average, has more than two (2.0) hydrolyzable groups bonded to silicon atom(s), is required. In case the polymer has more than two hydrolyzable ureido groups or two ureido and further hydrolyzable group(s) attached to different silicon atoms, the presence of a cross-linker is not required. In a typical preparation, the optional catalyst would be present in the composition in an amount from 0 to 10 parts, preferably in an amount from 0 to 5 parts, and the additional cross-linker, if required, would be present in an amount of from 0.1 to 20 parts, preferably in an amount from 0.1 to 10 parts, each by weight, based on 100 parts by weight of silicon modified organic polymer.

(i1) In another condensation cure system useful to the practice of the present invention, the organic polymer has at least two hydroxysilyl groups linked to the polymer via Si—C or Si—Y bonds, and the cross-linker has, on average, more than two (2.0) hydrolyzable amido groups bonded to silicon atom(s). The silicon modified organic polymer and the cross-linker are reacted, optionally in the presence of a condensation catalyst, selected from the group consisting of (organo)metallic compounds, amino compounds, carboxylic acids, salts of amino compounds, or mixtures of condensation catalysts. The cross-linker can be an imidato organosilane $(R_nSi((N=C(R')(OR''))_{4-n})$, where R, R', and R" are individually selected from the group consisting of hydrogen, monovalent hydrocarbon radical or substituted hydrocarbon radical having less than 7 carbon atoms, functionalized hydrocarbon radicals, and n either 0 or 1, as described, for example, in U.S. Pat. No. 3622,529, incorporated herein by reference. The cross-linker may also be a linear or cyclic siloxane oligomer containing imidatosiloxy groups, a silsesquioxane containing imidato and, optionally, other hydrolyzable or condensable groups bound directly to silicon atoms, an organic oligomer, polymer or resin bearing imidatosilyl groups and, optionally, other hydrolyzable or condensable silyl groups bound to carbon atom(s) via Si—C or Si—Y bonds. The cross-linker can also be a partial hydrolysis and condensation product (dimer, trimer, tetramer, etc.) of above cross-linkers. In a typical preparation, the optional catalyst would be present in the composition in an amount of from 0 to 10 parts, preferably in an amount of from 0 to 5 parts, and the cross-linker would be present in an amount of from 0.1 to 50 parts, preferably in an amount from 1 to 10 parts, each by weight, based on 100 parts by weight of silicon modified organic polymer.

(i2) In an alternative to the (i1) cure system, the organic polymer has at least two hydrolyzable imidato and, optionally, other hydrolyzable or condensable group(s) other than imidato bound to silicon atom(s). The polymer is then reacted, optionally in the presence of a condensation catalyst as described above, with a cross-linker having hydroxyl groups bound to silicon atoms. If the organic polymer bears only two hydrolyzable imidato groups and no further hydrolyzable groups, the cross-linker must have, on average, more than two (2.0) hydroxyl groups. If the organic polymer bears more than two hydrolyzable groups, the cross-linker must have, on average, at least two hydroxyl groups. The hydrolyzable groups may be attached to the same or different silicon atoms. In a typical preparation, the optional catalyst would be present in the composition in an amount from 0 to 10 parts, preferably in an amount from 0 to 5 parts, and the cross-linker, depending on its nature, would be present in an amount of from 0.1 to 50 parts, preferably in an amount from 1 to 10 parts, each by weight, based on 100 parts by weight of silicon modified organic polymer.

(i3) As a further alternative to the (i1) cure system, organic polymer having at least two hydrolyzable imidato group(s) and, optionally, other hydrolyzable or condensable group(s) other than imidato bound to different silicon atoms; can be crosslinked, optionally, in the presence of a condensation catalyst as described above. In case the polymer has only two hydrolyzable imidato groups and no further hydrolyzable group(s) attached to different silicon atoms, the presence of a cross-linker, which, on average, has more than two (2.0) hydrolyzable groups bonded to silicon atom(s), is required. In case the polymer has more than two hydrolyzable imidato groups or two imidato and further hydrolyzable group(s) attached to different silicon atoms, the presence of a cross-linker is not required. In a typical preparation, the optional catalyst would be present in the composition in an amount from 0 to 10 parts, preferably in an amount from 0 to 5 parts, and the additional cross-linker, if required, would be present in an amount of from 0.1 to 20 parts, preferably in an amount from 0.1 to 10 parts, each by weight, based on 100 parts by weight of silicon modified organic polymer.

(j1) In another condensation cure system useful to the practice of the present invention, the organic polymer has at least two hydroxysilyl groups linked to the polymer via Si—C or Si—Y bonds, and the cross-linker has, on average, more than two (2.0) hydrolyzable alken(yl)oxy groups bonded to silicon atom(s). The silicon modified organic polymer and the cross-linker are reacted in the presence of a condensation catalyst, selected from the group consisting of (organo)metallic compounds, amino compounds, carboxylic acids, salts of amino compounds, or mixtures of condensation catalysts. The alkenoxy cure system is described in detail in U.S. Pat. No. 5,145,901, incorporated herein by reference. The cross-linker can be an alkenoxy (enol) organosilane $R_nSiX^1_mX^2_{4-(n+m)}$, where $X^1$ is a hydrolyzable or condensable group other than alkenoxy, and $X^2$ is alkenoxy (—O—CR'=CR'$_2$), where n is either 0 or 1, m is either 0 or 1, and R and R' are individually selected from the group consisting of hydrogen, monovalent hydrocarbon radical or substituted hydrocarbon radical having less than 7 carbon atoms, and functionalized hydrocarbon radicals. The preferred alkenoxysilane cross-linker is vinyltriisopropenoxysilane. The cross-linker may also be a linear or cyclic alkenoxysiloxanes, a silsesquioxane containing alkenoxy and, optionally, other hydrolyzable or condensable groups bound directly to silicon atoms, an organic oligomer, polymer or resin bearing alkenoxysilyl groups and, optionally, other hydrolyzable or condensable silyl groups bound to carbon atom(s) via Si—C or Si—Y bonds. The cross-linker may also be a partial hydrolysis and condensation product (dimer, trimer, tetramer, etc.) of above cross-linkers. In a typical preparation, the catalyst would be present in the composition in an amount of from 0.01 to 10 parts, preferably in an amount of from 0.1 to 5 parts, and the cross-linker would be present in an amount of from 0.1 to 50 parts, preferably in an amount from 1 to 10 parts, each by weight, based on 100 parts by weight of silicon modified organic polymer.

(j2) In an alternative to the (j1) cure system, the organic polymer has at least two hydrolyzable alkenoxy and, optionally, other hydrolyzable or condensable group(s) other than alkenoxy bound to silicon atom(s). The polymer is then reacted in the presence of a condensation catalyst, as described above, with a cross-linker having hydroxyl groups bound to silicon atoms, as disclosed and described in Japanese Patent No. 58,057,458, which is incorporated herein by reference. If the organic polymer bears only two hydrolyzable alkenoxy groups and no further hydrolyzable groups, the cross-linker must have, on average, more than two (2.0) hydroxyl groups. If the organic polymer bears more than two hydrolyzable groups, the cross-linker must have, on average, at least two hydroxyl groups. The hydrolyzable groups may be attached to the same or different silicon atoms. In a typical preparation, the catalyst would be present in the composition in an amount from 0.01 to 10 parts, preferably in an amount from 0.1 to 5 parts, and the cross-linker, depending on its nature, would be present in an amount of from 0.1 to 50 parts, preferably in an amount from 1 to 10 parts, each by weight, based on 100 parts by weight of silicon modified organic polymer.

(j3) As a further alternative to the (j1) cure system, organic polymer having at least two hydrolyzable alkenoxy groups and, optionaland, optionally, other hydrolyzable or condensable group(s) other than alkenoxy bound to different silicon atoms; can be crosslinked in the presence of a condensation catalyst, as described above. The reaction is disclosed and described in Japanese Patent No. 58,057,457 and German Patent No. 3,011,020, which is incorporated herein by reference. In case the polymer has only two hydrolyzable alkenoxy groups and no further hydrolyzable group(s) attached to different silicon atoms, the presence of a cross-linker, which, on average, has more than two (2.0) hydrolyzable groups bonded to silicon atom(s), is required. In case the polymer has more than two hydrolyzable alkenoxy groups or two alkenoxy and further hydrolyzable group(s) attached to different silicon atoms, the presence of a cross-linker is not required. In a typical preparation, the catalyst would be present in the composition in an amount from 0.01 to 10 parts, preferably in an amount from 0.1 to 5 parts, and the additional cross-linker, if required, would be present in an amount of from 0.1 to 20 parts, preferably in an amount from 0.1 to 10 parts, each by weight, based on 100 parts by weight of silicon modified organic polymer.

(k1) In another condensation cure system useful to the practice of the present invention, the organic polymer has at least two hydroxysilyl groups linked to the polymer via Si—C or Si—Y bonds, and the cross-linker has, on average, more than two (2.0) hydrolyzable isocyanato groups bonded to silicon atom(s). The silicon modified organic polymer and the cross-linker are reacted in the presence of a condensation catalyst, selected from the group consisting of (organo) metallic compounds, amino compounds, carboxylic acids, salts of amino compounds, or mixtures of condensation catalysts. The cross-linker may be an isocyanato organosilane of the formula $Si(NCO)_4$, $Rsi(NCO)_3$, $(RO)Si(NCO)_3$, etc., as described in Japanese Patent No. 57,168,946 and German Patent No. 2,653,498, both patents being incorporated herein by reference, where R is hydrogen, monovalent hydrocarbon radical or substituted hydrocarbon radical having less than 7 carbon atoms, functionalized hydrocarbon radicals, nitrogen compounds of the formula —N=CR'$_2$ or —NR'COR' or —NR'$_2$ or —NR", and R' is either hydrogen, monovalent hydrocarbon radicals having less than 7 carbon atoms, and R" is cycloalkyl radical. The cross-linker may also be a linear or cyclic siloxane oligomer containing isocyanatosiloxy groups, a silsesquioxane containing isocyanato and, optionally, other hydrolyzable or condensable groups bound directly to silicon atoms, an organic oligomer, polymer or resin bearing isocyanatosilyl groups and, optionally, other hydrolyzable or condensable silyl groups bound to carbon atom(s) via Si—C or Si—Y—C bonds. The cross-linker may also be a partial hydrolysis and condensation product (dimer, trimer, tetramer, etc.) of above cross-linkers. In a typical preparation, the condensation catalyst would be present in the composition in an amount of 0.01 to 5 parts, preferably in an amount of from 0.01 to 2 parts, the cross-linker would be present in an amount of from 0.1 to 50 parts, preferably in an amount from 1 to 10 parts, each by weight, based on 100 weight parts of organic or silicon modified organic polymer.

(k2) In an alternative to the (k1) cure system, the organic polymer has at least two hydrolyzable isocyanato and, optionally, other hydrolyzable or condensable group(s) other than isocyanato bound to silicon atom(s). The polymer is then reacted in the presence of a condensation catalyst, as described above, with a cross-linker having hydroxyl groups bound to silicon atoms. In a typical preparation, the catalyst would be present in the composition in an amount from 0.01 to 5 parts, preferably in an amount from 0.01 to 2 parts, and the cross-linker, depending on its nature, would be present in an amount of from 0.1 to 50 parts, preferably in an amount from 1 to 10 parts, each by weight, based on 100 weight parts of organic or silicon modified organic polymer.

(k3) As a further alternative to the (k1) cure system, a silicon modified polymer bearing isocyanato groups and optionally hydrolyzable or condensable groups bonded directly to silicon atoms, is reacted, in the presence of a condensation catalyst, and, in case the polymer bears only one isocyanato group and no further hydrolyzable group(s), also in the presence of a cross-linker, which, on average, has more than two (2.0) hydrolyzable groups bonded to silicon atom(s). In a typical preparation, the catalyst would be present in the composition in an amount from 0.01 to 5 parts, preferably in an amount from 0.01 to 2 parts, and the additional cross-linker, if required, would be present in an amount of from 0.1 to 20 parts, preferably in an amount from 0.1 to 10 parts, each by weight, based on 100 weight parts of silicon modified organic polymer.

(l) Another condensation cure system useful for the practice of this invention, uses a cross-linker, bearing, on average, more than two (2.0) reactive silanol groups to effect the cure, in the presence of a condensation catalyst, of a silicon modified polymer bearing hydroxy or other hydrolyzable groups attached directly to silicon atom(s). The cross-linker is selected from the group consisting of silica, silicate, siliconate, silanolate, silanol functional silicone resins, and silanol functional organic oligomer, polymer, or resin, where the silanol groups are bonded to carbon atom(s) via Si—Y bonds. Siliconates and silanolates useful for this invention can be represented by the formulae $Rsi(O^-M^+)_n(OH)_{3-n}$ and $R_2Si(OM)_m(OH)_{2-m}$, respectively, where R is monovalent hydrocarbon radical, substituted hydrocarbon radical having less than 7 carbon atoms, or functionalized hydrocarbon radical, and M is selected from the group consisting of an alkali metal cation, an ammonium group, and a phosphonium group, and n is an integer or fraction having value of from 0.1 to 3, and m is an integer or fraction having a value of from 0.1 to 2. The cross-linker may also be a partial condensation product (dimer, trimer, tetramer, etc.) of the above cross-linkers. Crosslinking of hydroxysiloxy endblocked siloxanes with siliconates of formula $Rsi(O^-M^+)_m(OH)_{3-m}$ in emulsions are described, for example, in U.S. Pat. No. 4,816,506, incorporated herein by reference. The cross-linker is typically added to the emulsion of the silicon modified organic polymer. It may be added either directly to the high solids thick phase or gel phase, or may be added to the emulsion after further dilution with water. This type of crosslinking reaction is well known in the art, and described in U.S. Pat. 4,221,688, 4,244,849, 4,273,813, 5,004,771, 3,355,406, which are incorporated herein by reference. In a typical preparation, the condensation catalyst would be present in the composition in an amount of from 0.01 to 10 parts, preferably in an amount of from 0.01 to 5 parts, and the cross-linker, depending on its nature, would be present in an amount of from 0.1 to 50 parts, preferably in an amount from 1 to 30 parts, each by weight, based on 100 weight parts of siloxane polymer.

The condensation cures utilized in the present invention are not limited to those described above. It is anticipated that any condensation cure useful in the area of siloxane polymers can be employed with silicon modified organic polymers.

Non-volatile Cure Systems

The following class of cure systems that do not generate volatile by-products {"tethered leaving groups") is useful in the practice of the current invention.

(n1) In a cure system useful for the practice of this invention, the organic polymer has at least two hydroxysilyl groups linked to the polymer via Si—C or Si—Y bonds, and the cross-linker has, on average, more than two (2.0) silacycloalkane groups. The silicon modified organic polymer and the cross-linker are reacted in the presence of a nucleophilic catalyst, such as an amine, a hydroxyl amine, a guanidine, a N-alkylated guanidine, an urea, or a N-alkylated urea. The preferred catalyst is a dialkylhydroxylamine. The most preferred catalyst is dimethylhydroxylamine. The silacycloalkane cure system is described in detail in U.S. Pat. Nos. 4,965,367, 4,985,568, 5,001,187, 5,049,688, 5,110,967, and European Patent Nos. 0,423,684 and 0,423,685, all patents being incorporated herein by reference. The cross-linker can be a compound bearing silacycloalkane groups —(Si(CH2)n), the preferred cross-linker is a compound bearing silacyclobutane groups. The silacycloalkane group(s) may be attached to the cross-linker via Si—C, Si—Y, Si—(O—Si)$_n$—C, or Si—(O—Si)$_n$—Y—C bonds, wherein n is a positive integer. The cross-linker may also be a linear or cyclic siloxane containing silacycloalkane radicals, a silsesquioxane containing silacycloalkane radicals, an organic oligomer, polymer or resin bearing silacycloalkane groups bound to carbon atom(s) via Si—C, Si—Y, Si—(O—Si)$_n$—C, or Si—(O—Si)$_n$—Y—C bonds. In a typical preparation, the catalyst would be present in the composition in an amount of from 0.01 to 10 parts, preferably in an amount of from 0.1 to 5 parts, and the cross-linker would be present in an amount of from 0.1 to 50 parts, preferably in an amount from 1 to 10 parts, each by weight, based on 100 parts by weight of silicon modified organic polymer.

(n2) In an alternative to the (n1) cure system, the organic polymer has at least two silacycloalkane groups attached to the polymer via Si—C, Si—Y, Si—(O—Si)$_n$—C, or Si—(O—Si)$_n$—Y—C bonds. The polymer is then reacted in the presence of a nucleophilic catalyst, as described above, with a cross-linker having hydroxyl groups bound to silicon atoms. If the organic polymer bears only two silacycloalkane groups and no further hydrolyzable groups, the cross-linker must have, on average, more than two (2.0) hydroxyl groups. If the organic polymer bears more than two silacycloalkane or other hydrolyzable groups in total, the cross-linker must have, on average, at least two hydroxyl groups. The hydrolyzable groups may be attached to the same or different silicon atoms. In a typical preparation, the catalyst would be present in the composition in an amount from 0.01 to 10 parts, preferably in an amount from 0.1 to 5 parts, and the cross-linker, depending on its nature, would be present in an amount of from 0.1 to 50 parts, preferably in an amount from 1 to 10 parts, each by weight, based on 100 parts by weight of silicon modified organic polymer.

(n3) As a further alternative to the (n1) cure system, an organic polymer having at least two silacycloalkane groups attached to the polymer via Si—C, Si—Y, Si—(O—Si)$_n$—C, or Si—(O—Si)$_n$—Y—C bonds and, optionally, other hydrolyzable or condensable group(s) other than silacycloalkane bound to different silicon atoms; can be crosslinked in the presence of a nucleophilic catalyst, as described above. In case the polymer has only two silacycloalkane groups and no further hydrolyzable group(s), the presence of a cross-linker, which, on average, has more than two (2.0) hydrolyzable groups bonded to silicon atom(s), is required. In case the polymer has more than two silacycloalkane groups or two silacycloalkane groups and further hydrolyzable group (s) attached to different silicon atoms, the presence of a cross-linker is not required. In a typical preparation, the catalyst would be present in the composition in an amount from 0.01 to 10 parts, preferably in an amount from 0.1 to 5 parts, and the additional cross-linker, if required, would be present in an amount of from 0.1 to 20 parts, preferably in an amount from 0.1 to 10 parts, each by weight, based on 100 parts by weight of silicon modified organic polymer.

(o1) In another cure system useful for the practice of this invention, the organic polymer has at least two hydroxysilyl groups linked to the polymer via Si—Y bonds, and the cross-linker has, on average, more than two (2.0) aza-silacycloalkane, cyclosilalactam, or cyclosila-urea groups. The silicon modified organic polymer and the cross-linker are reacted in the presence of a condensation catalyst, selected from the group consisting of (organo)metallic compounds, amino compounds, carboxylic acids, salts of amino compounds, or mixtures of condensation catalysts. The aza-silacycloalkane, cyclosilalactam and cyclosila-urea cure system is described in detail in U.S. Pat. Nos. 5,136, 064, 5,238,988, 5,239,099, 5,254,645, and World Patent No. 94/14820, all patents being incorporated herein by reference. The cross-linker can be a compound bearing aza-silacycloalkane, cyclosilalactam, or cyclosila-urea groups attached to the cross-linker via Si—C, Si—Y, Si—(O—Si)$_n$—C, or Si—(O—Si)$_n$—Y—C, N—C, or N—Y—C, bonds, wherein n is a positive integer. The preferred cross-linker is a compound bearing aza-silacyclopentane groups. The cross-linker may also be a linear or cyclic siloxane, a silsesquioxane, an organic oligomer, polymer or resin, bearing aza-silacycloalkane, cyclosilalactam, or cyclosila-urea radicals attached via Si—C, Si—Y, Si—(O—Si)$_n$—C, Si—(O—Si)$_n$—Y—C, N—C, or N—Y—C bonds. In a typical preparation, the catalyst would be present in the composition in an amount of from 0.01 to 10 parts, preferably in an amount of from 0.1 to 5 parts, and the cross-linker would be present in an amount of from 0.1 to 50 parts, preferably in an amount from 1 to 10 parts, each by weight, based on 100 parts by weight of silicon modified organic polymer.

(o2) In an alternative to the (o1) cure system, the organic polymer has at least two aza-silacycloalkane, cyclosilalactam, or cyclosila-urea groups, attached to the polymer either via the silicon or nitrogen atoms (via Si—C, Si—Y, Si—(O—Si)$_n$—C, Si—(O—Si)$_n$—Y—C, N—C, or N—Y—C bonds). The polymer is then reacted in the presence of a condensation catalyst, as described above, with a cross-linker having hydroxyl groups bound to silicon atoms. If the organic polymer bears only two aza-silacycloalkane, cyclosilalactam, or cyclosila-urea groups and no further hydrolyzable groups, the cross-linker must have, on average, more than two (2.0) hydroxyl groups. If the organic polymer bears more than two aza-silacycloalkane, cyclosilalactam, or cyclosila-urea groups or other hydrolyzable groups in total, the cross-linker must have, on average, at least two hydroxyl groups. In a typical preparation, the catalyst would be present in the composition in an amount from 0.01 to 10 parts, preferably in an amount from 0.1 to 5 parts, and the cross-linker, depending on its nature, would be present in an amount of from 0.1 to 50 parts, preferably in an amount from 1 to 10 parts, each by weight, based on 100 parts by weight of silicon modified organic polymer.

(o3) As a further alternative to the (o1) cure system, organic polymer having at least two aza-silacycloalkane, cyclosilalactam, or cyclosila-urea groups, bound to the polymer via either silicon or nitrogen atoms (via Si—C, Si—Y, Si—(O—Si)$_n$—C, Si—(O—Si)$_n$—Y—C, N—C, or N—Y—C bonds), and, optionally, other hydrolyzable or condensable group(s) other than aza-silacycloalkane, cyclosilalactam, or cyclosila-urea bound to different silicon atoms; can be crosslinked in the presence of a condensation catalyst, as described above. In case the polymer has only two aza-silacycloalkane, cyclosilalactam, or cyclosila-urea groups and no further hydrolyzable group(s) attached to different silicon atoms, the presence of a cross-linker, which, on average, has more than two (2.0) hydrolyzable groups bonded to silicon atom(s), is required. In case the polymer has more than two aza-silacycloalkane, cyclosilalactam, or cyclosila-urea groups or two aza-silacycloalkane, cyclosilalactam, or cyclosila-urea groups and further hydrolyzable group(s) attached to different silicon atoms, the presence of a cross-linker is not required. In a typical preparation, the catalyst would be present in the composition in an amount from 0.01 to 10 parts, preferably in an amount from 0.1 to 5 parts, and the additional cross-linker, if required, would be present in an amount of from 0.1 to 20 parts, preferably in an amount from 0.1 to 10 parts, each by weight, based on 100 parts by weight of silicon modified organic polymer.

The non-volatile cures utilized in the present invention are not limited to those described above. It is anticipated that any non-volatile cure useful in the area of siloxane polymers can be employed with silicon modified organic polymers.

Organic Cure Systems

The following class of miscellaneous organic cure systems is useful in the practice of this invention. It is anticipated that any of the reactions discussed above that are used to attached curable silicon functionalities to organic polymers can also be utilized in forming crosslinked silicon modified organic polymers. Examples of such reactions are:

(p) the addition reaction between an alkenyl group and a mercapto group; the reaction occuring such that one of the functional groups is attached to the polymer, the other functional group is attached to the cross-linker, and either only one of the functional groups or both functional groups are attached via Si—C or Si—Y—C bonds;

(q) the reaction between an isocyanate group and a compound having an active hydrogen atom, such as in an amino, amido, ureido, mercapto, etc. group; the reaction occuring such that one of the functional groups is attached to the polymer, the other functional group is attached to the cross-linker, and either only one of the functional groups or both functional groups are attached via Si—C or Si—Y—C bonds;

(r) the reaction between an active hydrogen atom, such as in a hydroxyl, amino, amido, ureido, mercapto, etc. group, and a compound having an epoxy group; the reaction occuring such that one of the functional groups is attached to the polymer, the other functional group is attached to the cross-linker, and either only one of the functional groups or both functional groups are attached via Si—C or Si—Y—C bonds;

(s) the reaction between a carboxylic acid ester, carboxylic acid chloride, or carboxylic acid anhydride groups and a compound bearing an active hydrogen atom; the reaction occuring such that one of the functional groups is attached to the polymer, the other functional group is attached to the cross-linker, and either only one of the functional groups or both functional groups are attached via Si—C or Si—Y—C bonds;

Examples of such cure chemistries are disclosed, for instance, in German Patent No. 2,941,725 (mercapto functional polymer, isocyanate functional cross-linker), World Patent No. 93/08227 (carbinol functional polymer, isocyanate functional cross-linker), German Patent No. 4,211,256 (amino functional polymer, carboxylic anhydride functional cross-linker), German Patent No. 4,344,083 (amino functional polymer, epoxy functional cross-linker; amino functional polymer, isocyanate functional cross-linker); the patents being incorporated herein by reference.

The organic cures utilized in the present invention are not limited to those described above. It is anticipated that any organic cure chemistry useful in the area of siloxane polymers can be employed with silicon modified organic polymers.

Fillers

Fillers may be optionally added to the composition of the invention. Depending on the type of filler under consideration and the intended purpose of the filler addition, the filler may be added to the initial mixture of polymer, surfactant, and water, optionally also containing cross-linker and catalyst and optional formulation ingredients; it may be added after the initial emulsification step to the high solids thick phase or gel phase; or it may be added to the final latex dispersion after dilution with water. The filler may be added neat (dry) or as a dispersion (slurry) in water, in siloxane polymer, in silicon modified organic polymer, in organic polymer, in a mixture of polymers, in a mixture of polymer (s) and solvent(s), in solvent, or in any other suitable medium. Fillers may be added for reinforcing or extending (cheapening) the cured elastomer, or for achieving special performance characteristics of the wet latex dispersion or the cured elastomer, exemplified, but not limited to, such properties as handling characteristics, electrical conductivity, fire resistance, self-extinguishing feature, radiation shielding, or changes in the surface appearance or characteristics of the cured elastomer. Any filler which does not react with the latex emulsion or latex dispersion is suitable.

Fillers added for extending or reinforcing purposes typically have an average particle size below 10 micrometers, preferably below 2 micrometers, and are added at 10 to 200 weight parts, preferably 40 to 120 weight parts, per 100 weight parts of polymer. Examples of such fillers are aluminum oxide, hydrated aluminum hydroxide, diatomaceous earths, magnesium hydroxide, ground quartz, mica, calcium carbonate, clay, barium sulfate, zinc oxide, iron oxide, and talcum. If necessary, liquid alkoxy silanes which are soluble in the silicon modified organic polymer may be added with the filler to compatibilize the filler with the polymer.

Various pigments, such as carbon black or titanium dioxide, may also be added as fillers. Since these fillers are only intended to affect the color of the cured latex elastomer, they are typically added at 0.1 to 20 weight parts, preferably from 0.5 to 10 weight parts, per 100 weight parts of polymer. Titanium dioxide has been found to be particularly useful as an ultraviolet light screening agent.

It should be noted that selection and addition to the composition of particular fillers, may improve the physical properties of the resulting elastomer, particularly tensile property, elongation property, hardness and heat stability. Precipitated or fumed silicas may be used as reinforcing fillers. The latex dispersions of this invention which are cured with catalysts other than Sn(IV) compounds are particularly useful, because they can be reinforced with colloidal silicas without negatively effecting the shelf-life of the wet latex dispersion and/or the durability of the cured elastomer. Although common fumed and precipitated silicas can be used, colloidal silicas are much more effective in reinforcing the cured latex elastomers. Aqueous dispersions of fumed or precipitated colloidal silicas are commercially available. Stable dispersions of fumed silica in water are available at a Ph varying from 5 to 11. The amount of fumed silica in the dispersion varies from about 10 to about 30 percent by weight. Such fumed silica dispersions are available from CABOT Corporation under the trademark Cab-O-Speace (R). The dispersions are stated to be stabilized with Ammonium and sodium hydroxide. The above described dispersions of fumed silica are different from the aqueous sodium, ammonium, or aluminum ion stabilized sols of colloidal silica, such as described in U.S. Pat. No. 4,221,688. The colloidal silicas sols are commercially available from NALCO Chemical Company (Naperville, Ill.). Use of fumed silica dispersions and colloidal silica sols for reinforcement of latex dispersions are described in U.S. Pat. Nos. 5,162,429 and 5,321,075, incorporated herein by reference.

Non-siliceous filler are preferably used in latex dispersions of this invention cured with Sn(IV) compounds as catalyst, since they do not negatively affect the shelf-life of the wet latex dispersion and/or the durability of the cured elastomer. Precipitated surface treated calcium carbonates can be used as semi-reinforcing fillers, ground calcium carbonates, either treated or untreated, can be used as extending fillers.

Fillers which may be used to modify the surface appearance of the cured latex elastomer and/or to improve the workability of the wet latex dispersion include fibers of 0.1 to 100 millimeters length. The fiber may be selected from the group consisting of natural fibers, regenerated fibers, and synthetic fibers. Natural fibers include pulp, cotton, flax, silk, and wool. Regenerated fibers are such as rayon. Synthetic fibers include nylon, Kynar (R), polypropylene and polyester.

Fillers which may be used to achieve fire retardency or fire resistance of the cured latex elastomer include aluminum hydroxide (trihydrate), non-flammable fibers, ceramic or glass fibers or microspheres, and vermiculite, as described in U.S. Pat. No. 4,719,251, incorporated herein by reference.

Fillers which may be used to achieve electric conductivity of the cured latex elastomer include carbon black, metal coated ceramic spheres or fibers, metal coated glass spheres or fibers, uncoated or metal coated graphite fibers or spheres as disclosed in U.S. Pat. Nos. 4,545,914 and 4,547,312, incorporated herein by reference.

Resin Reinforcement

The latex dispersion of this invention can also be reinforced with silsesquioxanes, for instance a methylsilsesquioxane having the unit formula $Rsio_{3/2}$, which is prepared in an emulsion. The process of making these silsesquioxanes, having colloidal sized particles is found in U.S. Pat. No. 3,433,780, incorporated herein by reference. The silsesquioxanes can be employed in the form of colloidal suspensions, which are added to the polymer emulsion (made from polymer, surfactant, and water) or the crosslinked latex (made from polymer, surfactant, water and, if required cross-linker and catalyst). Copolymers and blends of the silsesquioxanes can be employed as well as the individual ones and the formula $Rsio_{3/2}$ is intended to include all such materials.

Catalyst Deactivation

For certain condensation cure chemistries and compositions in which the catalyst remains active and negatively affects shelf-life of the wet dispersion and/or durability of the cured elastomer, it may be desirable to add compounds to the instant composition that deactive (poison) the catalyst after the cure has sufficiently progressed. In this process, a sufficient "gestation time" of typically several days needs to be allowed before the catalyst can be quenched. Deactivation of Sn(IV) catalysts with alkyl mercaptan, 8-quinolinol, thio glycolic acid, and salts of thio glycolic acid has been disclosed in U.S. Pat. No. 4,609,486, incorporated herein by reference.

Stabilizers

For certain condensation cure chemistries and compositions in which the catalyst remains active and negatively affects shelf-life of the wet dispersion, it may be desirable to add compounds to the instant composition that act as shelf life stabilizers. Amine compounds, such as diethylamine, hydroxylamine, or 2-amino-2-methyl-1-propanol have been found to improve the shelf life (stability of properties) of the wet latex dispersions containing Sn(IV) catalysts and silicas. The preferred shelf life stabilizer is 2-amino-2-methyl-1-propanol, as disclosed in U.S. Pat. Nos. 4,427,811 and 4,608,412, incorporated herein by reference.

Other Additives

The latex dispersion of the present invention may contain additional ingredients to further modify the properties of the latex dispersion or the cured elastomeric products obtained from the latex dispersion. For example, thickeners, antifoams, dispersants, or freeze/thaw stabilizers may be added to the dispersion.

Articles, Uses

The latex dispersions of this invention can be applied as sealants, adhesives, putties, molding materials, coatings, or foams. The evaporation of water from the dispersion normally occurs by unattended exposure to the ambient atmosphere. The evaporation may be additionally assisted by a flow of dry air or other gas, either at ambient temperature or at elevated temperatures, by infrared heating, microwaving, or a combination of various means. Care should be taken when accelerated means are used to evaporate the aqueous phase that the rapidly leaving water vapor does not produce undesired discontinuities in the cured product.

EXAMPLES

The following examples are presented to further illustrate the compositions of this invention, but are not to be construed as limiting the invention, which is delineated in the appended claims. In the following examples, if not otherwise noted, the aforesaid wet dispersions were cast into films one day after the dispersions were made, and the film was allowed to dry for seven days prior to testing. Durometer results were obtained by the method described in ASTM C661 "Indentation Hardness of Elastomeric-Type Sealants by Means of a Durometer". Tensile and elongation results were obtained by the method described in ASTM D412 "Vulcanized Rubber and Thermoplastic Rubbers and Thermoplastic Elastomers—Tension" using dumbbell specimens with an L dimension equal to 0.5 inch. Parts are by weight unless stated otherwise.

Example 1

100 parts of Silmod® 20A (linear bis (3-(methyldimethoxysilyl)propyl)-polyoxypropylene polymer having an average molecular weight of 7,500 mixed with 5% dioctylphthalate plasticizer, viscosity of mixture is 13,000 Cps at 25 C.) supplied by Union Carbide Corp. (Danbury, Conn.) 2 parts of Tergitol® TMN-6 non-ionic surfactants (ethoxylated trimethylnonanol supplied by Union Carbide Chemicals & Plastics Co., Inc., Danbury, Conn.) and 3 parts deionized water were mixed in a laboratory mixer (Whip Mix, supplied by Whip Mix Corp., Louisville, Ky.) for 15 seconds under vacuum to form a water in oil emulsion. 5 parts of additional deionized water were added to this emulsion and the mixture was stirred for additional 15 seconds under vacuum to generate an oil in water emulsion. This emulsion was reduced to approximately 80% solids by adding 12 parts of deionized water in two equal additions with 15 seconds of stirring between additions. This emulsion was crosslinked by adding the following three ingredients sequentially with 15 seconds stirring between additions: 0.8 parts IBTMS (isobutyltrimethoxysilane); 1 part of Crosslinker A obtained by cold blending 74.6 parts of a short chain a,w-dihydroxyl endblocked polydimethylsiloxane fluid with a degree of polymerization (DP) of about 7 to 9 and a viscosity of 0.04 Pa s at 25° C. with 15.2 parts of N-(2-aminoethyl)-3-aminopropyltrimethoxysilane and 10.2 parts methyltrimethoxysilane; 0.2 parts DBTDA (dibutyltin diacetate). A sample of this crosslinked emulsion, cast onto a glass panel, dried to a clear, tack free elastomer which had excellent adhesion to glass.

Example 2

100 parts Silmod® 300 (branched bis(3-(methyldimethoxysilyl)propyl)polyoxypropylene polymer having an average molecular weight of 8,500, mixed with 5% dioctylphthalate plasticizer, viscosity of mixture is 23,000 Cps at 25 C.) supplied by Union Carbide Corp. (Danbury, Conn.), 2 parts of Tergitol® TMN-6 and 3 parts deionized water were mixed in a laboratory mixer (Whip Mix) for 15 seconds under vacuum to form a oil in water emulsion. 5 parts of additional deionized water was added to this emulsions and the mixture was stirred for additional 15 seconds under vacuum. This emulsion was reduced to approximately 80% solids by adding 12 parts of deionized water in two equal additions with 15 seconds of stirring between additions. This emulsion was crosslinked by adding the following three ingredients sequentially with 15 seconds stirring between additions: 0.8 parts IBTMS (isobutyltrimethoxysilane); 1 part of Crosslinker A and 0.2 parts DBTDA (dibutyltin diacetate). A sample of this crosslinked emulsion, cast onto a glass panel, dried to a clear, tack free elastomer which had excellent adhesion to glass.

Example 3

100 parts of Silmod® 20A, 0.8 parts IBTMS (isobutyltrimethoxysilane), 1.0 parts Crosslinker A, and 0.06 parts DBTDA (dibutylin diacetate) were mixed in a laboratory mixer (whip mix) for 15 seconds under vacuum, then 2.0 parts of Tergitol® TMN-6 and 2 parts of a 0.071 molar acetic acid solution in deionized water were added. This mixture was stirred for 15 seconds under vacuum to form a water in oil emulsion. The water in oil emulsion was further diluted with water to 80% polymer solids content by addition of 18 parts of 0.071 molar acetic acid solution in deionized water. This water in oil emulsion was inverted to an oil in water emulsion by passing it through a Microfluidizer (Microfluidics Corp., Newton, Mass.). One pass at 5000 psi pressure was sufficient to accomplish inversion of the emulsion. A sample of this crosslinked emulsion, cast onto a glass panel, dried to a clear, tack free elastomer which had excellent adhesion to glass.

Example 4

A silicone dispersion was prepared in the following manner: 5000 parts of an a,w hydroxyl endblocked polydimethylsiloxane ("PDMS") having a viscosity of 50 Pa s at 25° C. and an average molecular weight of about 110,000; 3 parts DBTDA (dibutyltin diacetate); 58 parts octadecanol; and 50 parts of Crosslinker A were charged to a 10 Liter Turello mixer (Turello, Italy) and mixed at 1200 rpm under vacuum for 30 minutes. Care was taken that the temperature of the mixture exceeded 59° C. during mixing in order to melt the octadecanol and achieve homogeneous mixture. The mixture was then allowed to cool for one hour to a temperature of 30° C. before 100 parts Tergitol® TMN-6 and 100 parts of a 0.071 molar acetic acid solution in deionized water were added. The mixture was then stirred at 1600 rpm under vacuum for 2 minutes to form a high solids, oil in water emulsion (characteristic clear gel phase). To this oil in water emulsion, 1000 parts of a 0.071 molar acetic acid solution in deionized water were slowly added while stirring the emulsion at 1200 rpm. After the addition step had been completed, the oil in water emulsion was stirred for further 5 minutes at 1200 rpm before adding 37.5 parts IBTMS (isobutyltrimethoxysilane). The stirring at 1200 rpm was continued for an additional 5 minutes. The crosslinked silicone latex with a polymer solids content of 80% was then transferred into a container and allowed to rest for 7 days.

The crosslinked silicone latex dispersion, prepared as described above, was then mixed with the silicone modified polyether latex dispersion, prepared as described in Example 3. The two dispersions were blended in a laboratory mixer (Whip Mix) using the following blend ratios (ratio of parts by weight of polyether to silicone dispersions): 75:25, 50:50, and 25:75.

Example 5

70 parts of S-303® (branched bis(3-(methyldimethoxysilyl)propyl)polyoxypropylene of average molecular weight 8,500 and viscosity of 27,000 Cps at 25° C., supplied by Kaneka America Corp. (New York, N.Y.), 30 parts S-203® (linear bis(3-(methyldimethoxysilyl)propyl)polyoxypropylene of average molecular weight 7,500 and viscosity of 17,000 Cps at 25° C., supplied by Kaneka America Corp.) 1 part IBTMS (isobutyltrimethoxysilane), and 0.2 parts DBTDA (dibutyltin diacetate) were mixed in a laboratory mixer (Hauschild Mixer) [Germany]) for 10 seconds. Then 3 parts of a silicon polyether surfactant (Dow Corning 5212-hydrosilylation product of heptamethyltrisiloxane and an ethoxylated allyl alcohol) and 3 parts deionized water were added and the mixture was stirred for 10 seconds in Hauschild mixer to form a water in oil emulsion. Then 10 parts of deionized water were added and the mixture stirred for 10 seconds in the Hauschild mixer to form an oil-in-water emulsion. Further 7 parts of deionized water were added, and the mixture again stirred for 10 seconds in the Hauschild mixer. A sample of this crosslinked oil-in-water emulsion, cast onto a glass panel, dried to a clear tack free elastomer which had excellent adhesion to glass.

A second sample of this crosslinked emulsion was cast onto polyethylene and allowed to dry at 23° F.±2° and 50%±5% relative humidity for 30 days. This clear tack free elastomer was tested for durometer, tensile at break, ultimate elongation and 200% modulus using a Shore A Durometer and an Instron Tester. The results were as follows:

| | |
|---|---|
| Tensile | 140 PSI |
| Elongation | 405% |
| 200% Modulus | 89 PSI |
| Durometer | 16 |

Example 6

70 parts of S-303®, 30 parts of S-203®, and 11.1 parts Desmodur N-3300 (polymeric aliphatic isocyanate, supplied by Miles Inc., Pittsburgh, Pa.) were mixed in a laboratory mixer (Hauschild Mixer) for 10 seconds. Then 1.1 parts IBTMS (isobutyltrimethoxysilane), and 0.22 parts DBTDA (dibutyltin diacetate) were added to the mixture. The mixture was then stirred in the Hauschild Mixer for another 10 seconds. Then 3.33 parts of a silicon polyether surfactant (hydrosilylation product of heptamethyltrisiloxane and an ethoxylated allyl alcohol) and 5.55 parts deionized water were added and the mixture was stirred for 10 seconds in Hauschild mixer to form a oil in water emulsion. A sample of this crosslinked oil-in-water emulsion, when cast immediately after preparation onto a glass panel, dried to a elastomeric foam which had excellent adhesion to glass.

A second sample of this crosslinked emulsion was cast onto polyethylene and allowed to dry at 23° F.±2° and 50%±5% relative humidity for 30 days this tack free elastomeric foam slab was tested for durometer, tensile at break, ultimate elongation and 200% modulus using a Shore A Durometer and an Instron Tester. The results were as follows:

| | |
|---|---|
| Tensile | 135 PSI |
| Elongation | 227% |
| 200% Modulus | 127 PSI |
| Durometer | 20 |

Example 7

100 parts of a linear a w-methyldimethoxysilyl endblocked polyisobutylene, having an average molecular weight of 9,442 a polydisperity of about 1.331, and an average dimethoxymethysilyl functionality of 1.65, the polymer being prepared in accordance with U.S. Pat. No. 5,290,873 by hydrosilation of an allyl—terminated polyisobutylene, and 11.1 parts of Actipol E-6 (polybutene with epoxide functionality on one end with a viscosity of 65 cSt at 38° C., supplied by Amoco Chemical Company, Chicago, Ill.) were mixed in Hauschild Mixer for 10 seconds. A further 11.1 parts of Actipol E-6 were added, and the mixture was stirred for another 10 seconds on the Hauschild Mixer. To this mixture, 4.4 parts of a silicon polyether surfactant (Dow Corning 5212-hydrosilation product of heptamethyltrisiloxane and an ethoxylated allyl alcohol) were added, and the mixture was stirred for another 10 seconds on the Hauschild mixer. To this mixture, 0.27 parts of DBTDA (dibutyltin diacetate) were added, and the mixture was stirred for another 10 seconds on the Hauschild mixer. Then 7.78 parts of deionized water were added, and the mixture was stirred for another 10 seconds on the Hauschild mixer to form an oil in water emulsion. To this oil in water emulsion, 14.4 parts of water were added, and the mixture was stirred for another 10 seconds on the Hauschild mixer. A sample of the crosslinked oil-in-water emulsion, when cast after 1 day onto a glass panel, dried to an elastomer which had excellent adhesion to glass.

A second sample of this crosslinked emulsion was cast onto polyethylene and allowed to dry at 23° F.±20° and 50%±5% relative humidity for 30 days this tack free elastomeric slab was tested for durometer, tensile at break, ultimate elongation and 200% modulus using a Shore A Durometer and an Instron Tester. The results were as follows:

| | |
|---|---|
| Tensile | 187 PSI |
| Elongation | 468% |
| 200% Modulus | 106 PSI |
| Durometer | 25 |

Example 8

63 parts of Kaneka S-303®, 27 parts of S-203®, and 10 parts of a linear a,w methyldimethoxysilyl endblocked polyisobutylene, having an average molecular weight of about 9,442 a polydisperity of about 1.331 and an average dimethoxymethysilyl functionality of 1.65, the polymer being prepared in accordance with U.S. Pat. No. 5,290,873 by hydrosilation of a decadiene endblocked polyisobutylene polymer, were mixed in Hauschild Mixer for 10 seconds. The 0.2 parts of DBTDA (dibutyltin diacetate) were added, and the mixture was stirred for another 10 seconds on the Hauschild Mixer. To this mixture, 3 parts of Tergitol® TMN-6 and 6 parts deionized water were added, and the mixture was stirred for another 10 seconds on the Hauschild mixer to form an oil in water emulsion. To this oil in water emulsion further 11 parts of deionized water were added, Samples of these crosslinked oil-in-water dispersion blends, cast onto a glass panel, dried to cloudy, tack free elastomers which had excellent adhesion to glass.

and the mixture was stirred for another 10 seconds on the Hauschild mixer. A sample of this crosslinked oil-in-water emulsion, when cast after 1 day onto a glass panel, dried to an elastomer which had excellent adhesion to glass.

A second sample of this crosslinked emulsion was cast onto polyethylene and allowed to dry at 23° C.±2° C. and 50%±5% relative humidity for 30 days this tack free elastomer slab was tested for durometer, tensile at break, ultimate elongation and 200% modulus using a Shore A Durometer and an Instron Tester. The results were as follows:

| Tensile | 143 PSI |
|---|---|
| Elongation | 519% |
| 200% Modulus | 71 PSI |
| Durometer | 17 |

Example 9

70 parts of S-303®, 27 parts of S-203®, 3.0 parts of a silicon polyether surfactant (hydrosilation product of heptamethyltrisiloxane and an ethoxylated allyl alcohol) and 6.0 parts of deionized water were stirred for 10 seconds in the Hauschild Mixer to form an oil in water emulsion. To this emulsion 14 parts of deionized water were added, and the emulsion was stirred for further 10 seconds in the Hauschild mixer. Then 1 part of IBTMS (isobutyltrimethoxysilane) was added, and the emulsion was stirred for further 10 seconds in the Hauschild mixer. Then 1 part of tin octoate was added, and the emulsion was stirred for further 10 seconds in the Hauschild mixer. A sample of this crosslinked oil-in-water emulsion, cast immediately after preparation onto a glass panel, dried to an elastomer which had excellent adhesion to glass.

A second sample of this crosslinked emulsion was cast onto polyethylene and allowed to dry at 23° C.±2° C. and 50%±5% relative humidity for 30 days this tack free elastomeric foam slab was tested for durometer, tensile at break, ultimate elongation and 200% modulus using a Shore A Durometer and an Instron Tester. The results were as follows:

| Tensile | 128 PSI |
|---|---|
| Elongation | 490% |
| 200% Modulus | 69 PSI |
| Durometer | 20 |

Example 10

70 parts of S-303®, 30 parts of S-203®, 0.2 parts of DBTDA (dibutyltin diacetate), and 1.0 parts IBTMS (isobutyltrimethoxysilane) was stirred in the Hauschild mixer for 10 seconds. Then 3.0 parts of a silicon polyether surfactant (hydrosilylation product of heptamethyltrisiloxane and an ethoxylated allyl alcohol) and 4.0 parts of deionized water were added, and the mixture was stirred for 10 seconds in Hauschild mixer to form a water in oil emulsion. To this emulsion, 6.0 parts of deionized water were added, and the emulsion was stirred for further 10 seconds in the Hauschild mixer to from an oil in water emulsion. To this oil in water emulsion, 20 parts of Rhoplex 2438 (an acrylic latex emulsion polymer with a glass transition temperature of Tg-20° C., supplied by Rohm & Haas, Philadelphia, Pa., as a 50.5% solids dispersion in water) was added, and the emulsion was stirred for further 10 seconds in the Hauschild mixer. A sample of this crosslinked oil-in-water emulsion, when cast immediately after preparation onto a glass panel, dried to a elastomer which had excellent adhesion to glass.

A second sample of this crosslinked emulsion was cast onto polyethylene and allowed to dry at 23° C.±2° C. and 50%±5% relative humidity for 30 days this tack free elastomeric slab was tested for durometer, tensile at break, ultimate elongation and 200% modulus using a Shore A Durometer and an Instron Tester. The results were as follows:

| Tensile | 179 PSI |
|---|---|
| Elongation | 832% |
| 200% Modulus | 62 PSI |
| Durometer | 15 |

Example 11

70 parts of S-303®, 30 parts of S-203®, and 2.0 parts of a 1 to 1 mixture of methyltriacetoxysilane and ethyltriacetoxysilane were mixed in the Hauschild mixer for 10 seconds. Then 3.0 parts of a silicon polyether surfactant (hydrosilylation product of heptamethyltrisiloxane and an ethoxylated allyl alcohol) and 6 parts of deionized water were added and the mixture was stirred for 10 seconds in Hauschild mixer to form a water-in-oil emulsion. Then further 14 parts of deionized water were added to the water in the oil emulsion and the emulsion was stirred for further 12 seconds in the Hauschild mixer. Then 1 part of Texin DOS 75 (sodium diisooctylsulfosuccinate, supplied by Henkel Corp., Ambler, Pa.) was added to the water in oil emulsion and the mixture was stirred for further 10 seconds in the Hauschild mixer to form an oil in water emulsion. A sample of this crosslinked oil-in-water emulsion, when cast immediately after preparation onto a glass panel, dried to a clear, tack free elastomer which had excellent adhesion to glass.

A second sample of this crosslinked emulsion was cast onto polyethylene and allowed to dry at 23° C.±2° C. and 50%±5% relative humidity for 30 days this tack free elastomeric slab was tested for durometer, tensile at break, ultimate elongation and 200% modulus using a Shore A Durometer and an Instron Tester. The results were as follows:

| Tensile | 91 PSI |
|---|---|
| Elongation | 539% |
| 200% Modulus | 46 PSI |
| Durometer | 10 |

Example 12

70 parts of S-303®, 30 parts of S-203®, and 4.0 parts of methyltrioximosilane were mixed in the Hauschild mixer for 10 seconds. Then 3 parts of a silicon polyether surfactant (hydrosilylation product of heptamethyltrisiloxane and an ethoxylated allyl alcohol) and 6 parts of deionized water were added and the mixture was stirred for 10 seconds in Hauschild mixer to form an oil in water emulsion. Then further 14 parts of deionized water were added to the oil in the water emulsion and the mixture was stirred for further 10 seconds in the Hauschild mixer. A sample of this crosslinked oil-in-water emulsion, when cast immediately after preparation onto a glass panel, dried to a elastomer which had excellent adhesion to glass.

A second sample of this crosslinked emulsion was cast onto polyethylene and allowed to dry at 23° C.±2° C. and 50%±5% relative humidity for 30 days this tack free elastomeric slab was tested for durometer, tensile at break, ultimate elongation and 200% modulus using a Shore A Durometer and an Instron Tester. The results were as follows:

| Tensile | 143 PSI |
|---|---|
| Elongation | 495% |
| 200% Modulus | 73 PSI |
| Durometer | 19 |

Example 13

Emulsion A: (Crosslinked Dimethoxysilyl Endblocked Polyether)

45.087 parts of S-303®, 19.324 parts of S-203®, 0.644 parts of IBTMS and 0.129 parts of DBTDA were mixed in the Hauschild mixer for 12 seconds. Then 1.932 parts of a silicon polyether surfactant (hydrosilylation product of heptamethyltrisiloxane and an ethoxylated allyl alcohol) and 3.8656 parts of deionized water were added and the mixture was stirred for 12 seconds in Hauschild mixer to form an oil in water emulsion. Then further 2.577 parts of deionized water were added to the oil-in-water emulsion and the mixture was stirred for further 12 seconds in the Hauschild mixer. Finally, another 6.442 parts of deionized water were added and the mixture was stirred for further 12 seconds in the Hauschild mixture. The crosslinked silicon modified polyether latex was then transferred into a container and allowed to rest for 7 days.

Emulsion B: Crosslinked Silicone Latex 651.47 parts of an a,w hydroxyl endblocked polydimethylsiloxane ("PDMS") having a viscosity of 50 Pa s at 25° C. and an average molecular weight of about 110,000; 13.01 parts aminoxy functional siloxane crosslinker of formula (CH3)3SiO(Si(CH3)2O)3(Si(CH3)(ON(CH2CH3)2)O)5Si(CH3)3, 13.04 parts MTM (methyltrimethoxysilane), 6.40 parts of Crosslinker A and 0.49 parts glacial acetic acid were charged to a 300 L Turello mixer and mixed at 800 rpm under vacuum for 2 minutes. Then 19.14 parts Terigtol TMN-10 non-ionic surfactant (ethoxylated trimethylnononal supplied by Union Carbide Chemicals & Plastics Co., Inc., Danbury, Conn.) and 15.32 parts of deionized water were added. The mixture was then stirred at 1200 rpm under vacuum for 10 minutes to form a high solids, oil-in-water emulsion (characteristic clear gel phase). To this oil in water emulsion, 87.10 parts of deionized water and 12.99 parts trimethylsiloxy endblocked polydimethylsiloxane having a viscosity of 350 cS were slowly added while stirring the emulsion at 800 rpm. The crosslinked silicone latex was then transferred into a container and allowed to rest for 7 days.

Calcium carbonate Filled Blend of Polyether and Silicone Latices 6.25 parts of deionized water and 0.20 parts of Terigtol® TMN-10 non-ionic surfactant were mixed in a Hauschild mixer for 10 seconds. To this aqueous surfactant solution, 25.00 parts of Omyacarb 3 (calcium carbonate (3 micron ground Calcium Carbonate Supplied by Omya Inc. Proctor Utah) were added and the mixture was stirred in a Hauschild Mixer for 10 seconds. To the resulting aqueous suspension of calcium carbonate were added, in two separate steps, 14.97 parts of emulsion A and 14.88 parts of emulsion B, each addition followed by stirring of the mixture in the Hauschild mixer for 10 seconds. A sample of this calcium carbonate filled, crosslinked oil-in-water emulsion, cast onto a polyethylene film, dried to a white, tack free elastomer. This tack free elastomer slab was tested for Durometer, tensile at break, ultimate elongation and 200% modulus using a Shore A durometer and an Instron Tester. The results were as follows:

| Tensile | 186 PSI |
|---|---|
| Elongation | 799% |
| 200% Modulus | 118 PSI |
| Durometer | 35 |

Example 14

Calcium carbonate Filled Silicone Modified Polyether Latex 6.25 parts of deionized water and 0.20 parts of Tergitol® TMN-10 non-ionic surfactant were mixed in a Hauschild mixer for 10 seconds. 25.00 parts of Omyacarb 3 (calcium carbonate) were added and the mixture was stirred in a Hauschild Mixer for 10 seconds. To the resulting aqueous suspension of calcium carbonate was added 29.94 parts of emulsion A of Example 13, followed by stirring of the mixture in the Hauschild mixer for 10 seconds. A sample of this calcium carbonate filled, crosslinked oil-in-water emulsion, cast onto a polyethylene film, dried to a white, tack free elastomer. This tack free elastomer slab was tested for durometer, tensile at break, ultimate elongation and 200% modulus using a Shore A durometer and an Instron Tester. The results were as follows:

| Tensile | 140 PSI |
|---|---|
| Elongation | 842% |
| 200% Modulus | 75 PSI |
| Durometer | 20 |

Example 15

Calcium Carbonate Filled Blend of Silicon Modified Polyether Latex and Acrylic Latex 6.00 parts of deionized water and 0.20 parts of Tergitol® TMN-10 non-ionic surfactant were mixed in a Hauschild mixer for 10 seconds. 25.00 parts of Omyacarb 3 (calcium carbonate) were added and the mixture was stirred in a Hauschild Mixer for 10 seconds. To the resulting aqueous suspension of calcium carbonate were added 4.95 parts of Rhoplex® 2438, followed by stirring of the mixture in the Hauschild mixer for 10 seconds. A sample of this calcium carbonate filled, crosslinked oil-in-water emulsion, cast onto a polyethylene film, dried to a white elastomer showing some residual surface tack, due to the low Tg of the acrylic polymer after 24 hours at 23°±2° C. and 50%±5% humidity. After 30 days dry time, a tack free elastomer slab was tested for durometer, tensile at break, ultimate elongation and 200% modulus using a Shore A durometer and an Instron Tester. The results were as follows:

| Tensile | 122 PSI |
|---|---|
| Elongation | 837% |
| 200% Modulus | 82 PSI |
| Durometer | 28 |

Example 16

Alumina Trihydrate Filled Silicone Modified Polyether Latex 6.25 parts of deionized water and 0.20 parts of Tergitol® TMN-10 non-ionic surfactant were mixed in a Hauschild mixer for 10 seconds. 25.00 parts of Spacerite S-3 (1 micron aluminum trihydrate supplied by Alcoa Industrial Chemicals Division Bauxite, Ark.) were added and the mixture was stirred in a Hauschild Mixer for 10 seconds. To the resulting aqueous suspension of alumina trihydrate was added 26.94 parts of emulsion A of Example 13, followed by stirring of the mixture in the Hauschild mixer for 10 seconds. A sample of this calcium carbonate filled, crosslinked oil-in-water emulsion, cast onto a polyethylene film, dried to a white, tack free elastomer. This tack free elastomer slab was tested for durometer, tensile at break, ultimate elongation and 200% modulus using a Shore A durometer and an Instron Tester. The results were as follows:

| Tensile | 133 PSI |
|---|---|
| Elongation | 502% |
| 200% Modulus | 109 PSI |
| Durometer | 27 |

Example 17

Comparative Example

Dimethoxysilyl Endblocked Polyether Emulsion 45.087 parts of S-303®, and 19.324 parts of S-203® were mixed in the Hauschild mixer for 12 seconds. Then 1.932 parts of a silicon polyether surfactant (hydrosilylation product of heptamethyltrisiloxane and an ethoxylated allyl alcohol) and 3.865 parts of deionized water were added and the mixture was stirred for 12 seconds in Hauschild mixer to form an oil in water emulsion. Then further 2.577 parts of deionized water were added to the oil in water emulsion and the mixture was stirred for further 12 seconds in the Hauschild mixer. Finally, another 6.442 parts of deionized water were added and the mixture was stirred for further 12 seconds in the Hauschild mixture. A sample of the silicon modified polyether emulsion, cast onto a polyethylene film, did not dry to an elastomer.

Example 18

50 parts of a linear a, w-methyldimethoxysilyl endblocked polyisobutylene, as described in Example 7, was mixed with 2.0 parts aminoxy functional siloxane crosslinker of formula (CH3)3SiO(Si(CH3)2O)3(Si(CH3)(ON(CH2CH3)2)O)5Si(CH3)3, 2.0 parts MTM (methyltrimethoxysilane), 1.0 parts of Crosslinker A and 0.49 parts glacial acetic acid were stirred together with a stainless steel spatula. To this mixture was added 3.0 parts of a silicon polyether surfactant (hydrosilation product of heptamethyltrisiloxane and an ethoxylated allyl alcohol) and 5.0 parts of deionized water were added and the mixture was stirred for 30 seconds in a laboratory mixer under vacuum to form an oil-in-water emulsion. 5 parts of additional deionized water was added to this emulsion and the mixture was stirred for additional 15 seconds under vacuum. This emulsion was reduced to approximately 80% solids by adding 10 parts of deionized water in two equal additions with 15 seconds of stirring between additions. This crosslinked silicone organic emulsion was cast on glass and polyethylene. It was found to dry to a tacky elastomer with cohesive adhesion to glass. After 30 days dry time, this slightly tacky elastomer was tested for durometer, tensile at break, ultimate elongation and 200% modulus using a Shore A Durometer and an Instron Tester. The results were as follows:

| Tensile | 63 PSI |
|---|---|
| Elongation | 1207% |
| 200% Modulus | 22 PSI |
| Durometer | 3 |

We claim:

1. A method of forming a aqueous dispersion of a crosslinked silicon-modified organic polymer comprising:

forming a premixture comprising:
a) 100 weight parts of silicon-modified organic polymer,
b) 0.5 to 10 weight parts surfactant and
c) 0.5 to 1000 weight parts water;

agitating the premixture to form an emulsion; and facilitating the crosslinking of the silicon-modified organic polymer in the emulsion;
wherein, the silicon-modified organic polymer is an organic polymer having a viscosity of 5 to 500 Pa.s, a glass transition temperature of less than 20° C., and 1 to 5 substitutents represented by the formula:

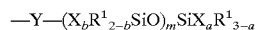

wherein $R^1$ is the same or different alkyl, alkenyl, aryl, or aralkyl group having 1 to 20 carbon atoms, or a triorganosiloxy group represented by the formula $R^2_3SiO—$, where $R^2$ individually is a monovalent hydrocarbon group having from 1 to 20 carbon atoms, X is the same or different hydroxyl group, condensable group or hydrolyzable group;

Y is a divalent group which forms hydrolytically stable bonds to the organic polymer and to a silicon atom of the substituent;

a is an integer from 0 to 3, b is an integer from 0 to 2 with the proviso that if a is 0 then b is 1 or 2 in at least one siloxane unit of the substituent and m is an integer of from 0 to 19 with the proviso that if m is 0 then a is 1, 2, or 3.

2. The method of claim 1, wherein the crosslinking of the silicon-modified organic polymer is facilitated by adding up to 5 weight parts catalyst to the emulsion.

3. The method of claim 1, wherein the crosslinking of the silicon-modified organic polymer is facilitated by adding up to 50 weight parts crosslinker to the emulsion.

4. The method of claim 2, wherein the crosslinking of the silicon-modified organic polymer is facilitated by adding up to 50 weight parts crosslinker to the emulsion.

5. The method of claim 2, comprising adding a catalyst deactivator to the composition after 3 to 14 days of gestation time.

6. The method of claim 1, wherein the organic polymer is selected from the group consisting of polyether, polyester, ether-ester block co-polymer, polyurethane, polysulfide, polythioether, polythioester, polybutadiene, hydrogenated polybutadiene, styrene-butadiene co-polymer, acrylate-butadiene co-polymer, ethylene-butadiene co-polymer, vinylpyridinebutadiene co-polymer, ethylene-propylene co-polymer, ethylenevinyl acetate co-polymer, ethylene-acrylate co-polymer, polyisoprene, styrene-isoprene co-polymer, polyisobutylene, isobutylene-isoprene co-polymer, polychloroprene, styrene-chloroprene co-polymer, acrylonitrile-chloroprene co-polymer, polyacrylate, polymethacrylate, siloxane-ether block co-polymer, siloxane-olefin block co-polymer, fluoroolefin-ether co-polymer, and poly(perfluoroether).

7. The method of claim 1, wherein the silicon-modified organic polymer is crosslinked using a condensation reaction, in the presence of a condensation catalyst selected from the group consisting of organometallic compounds, amino compounds, carboxylic acids, salts of amino compounds with carboxylic or other acids, low molecular weight polyamide resins obtained by the reaction of excess of polyamines with polybasic acids, the reaction products between epoxy compounds and an excess of polyamines, and mixtures of aforesaid condensation catalysts.

8. The method of claim 3, wherein the crosslinker has on average at least one hydrolyzable or condensable group and is selected from the group consisting of $R_nSiX_{(4-n)}$, $_nSiX_{4-n}$, $R_3SiO(SiR_2O)_a(SiRXO)_bSiR_3$, cyclic siloxanes represented by the formula $(R_2SiO)_a(RXSiO)_b$, silsesquioxanes, containing X groups bound directly to silicon atoms, organic oligomers, polymers or resins bearing Si—X groups bound to carbon atom(s) via Si—C or Si—Y—C bonds, the partial hydrolysis products of the above crosslinkers; and mixtures of the above crosslinkers, where:

X is the same or different hydrolyzable or condensable group individually selected from the class consisting of alkoxy, aryloxy, alkoxyalkoxy, alkoxyaryloxy, alkenoxy (—O—CR'=CR'$_2$), acyloxy (O(O)CR'), oximo (O—N=CR'$_2$), amino (NR'$_2$ or NR"), aminoxy (ONR'$_2$ or ONR"), amido (NR'—(CO)—R"), ureido (NR'—(CO)—NR'$_2$), imidato (N=CR'$_2$), and isocyanato (—NCO), R is individually selected from the group consisting of hydrogen, monovalent hydrocarbon radical and substituted hydrocarbon radicals having less than 7 carbon atoms, functionalized hydrocarbon radicals, and nitrogen compounds of the formula —N=CR'$_2$ or —NR'COR' or —NR'$_2$ or —NR", R' is either hydrogen or monovalent hydrocarbon or substituted hydrocarbon radical, R" is a cycloalkyl radical, a and b are independently either 0 or a positive integer, n is either 0, 1, 2, or 3.

9. The method of claim 3, wherein the crosslinking is facilitated by a crosslinker and an optional catalyst, and the crosslinker is selected from the group consisting of hydroxy functional linear and cyclic siloxanes, liquid copolymers comprising $SiO_2$ and/or $SiO_{3/2}$ units and bearing silicon bonded hydroxyl groups, silsesquioxane containing hydroxyl groups bound directly to silicon atoms, and organic oligomers, polymers or resins having hydroxysilyl groups bound to carbon atom(s) via Si—C or Si—Y—C bonds, and the silicon modified organic polymer bears at least two X groups, wherein said X groups are the same or different hydrolyzable or condensable groups individually selected from the group consisting of alkoxy, aryloxy, alkoxyalkoxy, alkoxyaryloxy, alkenoxy, acyloxy, oximo, amino, aminoxy, amido, ureido, imidato, and isocyanato.

10. The method of claim 3, wherein the silicon modified organic polymer bears at least one X group, wherein X is the same or different hydrolyzable or condensable group individually selected from the group consisting of acyloxy, oximo, amino, aminoxy, amido, ureido, imidato, and isocyanato and wherein the cross-linker is selected from the group consisting of hydroxy functional linear and cyclic siloxanes, liquid copolymers comprising $SiO_2$ and/or $SiO_{3/2}$ units and bearing silicon bonded hydroxyl groups, silsesquioxane containing hydroxyl groups bound directly to silicon atoms, and organic oligomers, polymers or resins having hydroxysilyl groups bound to carbon atom(s) via Si—C or Si—Y—C bonds.

11. The method of claim 1, wherein the silicon modified organic polymer bears at least one X group, wherein X is the same or different hydrolyzable or condensable group individually selected from the group consisting of acyloxy, oximo, amino, aminoxy, amido, ureido, imidato, and isocyanato.

12. The method of claim 4, wherein the silicon modified organic polymer bears at least two X groups, the catalyst is a condensation catalyst, and the cross-linker has on average, more than two (2.0) hydrolyzable X groups; wherein X is the same or different hydrolyzable or condensable group individually selected from the group consisting of alkoxy, aryloxy, alkoxyalkoxy, alkoxyaryloxy and alkenoxy (—O—CR'=CR'$_2$) groups, wherein R' is either hydrogen or monovalent hydrocarbon or substituted hydrocarbon radical.

13. The method of claim 1, wherein the silicon modified organic polymer bears at least two X groups, and an optional condensation catalyst is present, wherein X is the same or different hydrolyzable or condensable group selected from the group consisting of alkoxy, aryloxy, alkoxyalkoxy, alkoxyaryloxy, alkenoxy, acyloxy, oximo, amino, aminoxy, amido, ureido, imidato, and isocyanato.

14. The method of claim 13, wherein a crosslinker is added bearing, on average, more than two (2.0) hydrolyzable groups.

15. The method of claim 4, wherein the silicon modified organic polymer bears at least two hydroxysilyl or alkoxysilyl groups, the catalyst is a condensation catalyst, and the cross-linker is selected from the group consisting of silica, silicate, siliconate ($RSi(O^-M^+)_n(OH)_{3-n}$), silanolate ($R_2Si(OM)_m(OH)_{2-m}$) (where R is monovalent hydrocarbon radical, substituted hydrocarbon radical, or functionalized hydrocarbon radical, M is selected from the group consisting of an alkali metal cation, an ammonium group, and a phosphonium group, and n is an integer or fraction having value of from 0.1 to 3, and m is an integer or fraction having a value of from 0.1 to 2), silanol functional silicone resin, and silanol functional organic resins and partial condensation products of above cross-linkers, which are not fully condensed.

16. The method of claim 4, wherein the silicon modified organic polymer bears at least two hydroxysilyl groups, the catalyst is a nucleophilic catalyst, and the crosslinker is a silane, a linear or cyclic siloxane, a silsesquioxane, an organic oligomer, polymer, or resin bearing at least two silacycloalkane group(s) —(Si(CH$_2$)$_n$), attached to the cross-linker via Si—C, Si—Y, Si—(O—Si)$_n$—C, or Si—(—Si)$_n$—Y—C bonds, wherein n is a positive integer.

17. The method of claim 2, wherein the silicon modified organic polymer, bears at least two silacycloalkane groups, the catalyst is a nucleophilic catalyst, and an optional cross-linker selected from the group consisting of hydroxy functional linear and cyclic siloxanes, liquid copolymers comprising $SiO_2$ and/or $SiO_{3/2}$ units and bearing silicon bonded hydroxyl groups, silsesquioxane containing hydroxyl groups bound directly to silicon atoms, and organic oligomers, polymers or resins having hydroxysilyl groups.

18. The method of claim 3, wherein the silicon modified organic polymer bears at least two hydroxysilyl groups, a condensation catalyst which is optionally present, and a cross-linker selected from the group consisting of a silane, a linear or cyclic siloxane, a silsesquioxane, an organic oligomer, polymer, and resin bearing at least two aza-silacycloalkane, cyclosilalactam, and cyclosila-urea group (s) attached to the cross-linker.

19. The method of claim 3, wherein the silicon modified organic polymer, bears at least two groups X where X is selected from the group consisting of aza-silacycloalkane, cyclosilalactam, cyclosila-urea, and other hydrolyzable and condensable groups, a condensation catalyst optionally present, and a cross-linker selected from the group consisting of hydroxy functional linear or cyclic siloxanes, liquid copolymers comprising $SiO_2$ and/or $SiO_{3/2}$ units and bearing silicon bonded hydroxyl groups, silsesquioxane containing hydroxyl groups bound directly to silicon atoms, and organic oligomers, polymers or resins having hydroxysilyl groups.

20. The method of claim 19, wherein a crosslinker is present and the crosslinker bears on average, more than two (2.0) hydrolyzable groups bonded to one or more silicon atoms.

21. The method of claim 2, where the catalyst is a Sn(IV) compound which is deactivated by addition of a complexing compound.

22. An aqueous dispersion comprising:
  a) 100 weight parts of a crosslinked, silicon-modified organic polymer,
  b) 0.5 to 10 weight parts surfactant and
  c) 0.5 to 1000 weight parts water;
wherein the crosslinked, silicon-modified organic polymer is a crosslinked product of an organic polymer having a viscosity of 5 to 500 Pa.s, a glass transition temperature of less than 20° C., and 1 to 5 substituents represented by the formula:

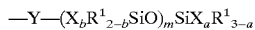

wherein $R^1$ is the same or different alkyl, alkenyl, aryl, or aralkyl group having 1 to 20 carbon atoms, or a triorganosiloxy group represented by the formula $R^2_3SiO—$, where $R^2$ individually is a monovalent hydrocarbon group having from 1 to 20 carbon atoms; X is the same or different hydroxyl group, condensable group or hydrolyzable group; Y is a divalent group which forms hydrolytically stable bonds to the organic polymer and to a silicon atom of the substituent; a is an integer from 0 to 3; b is an integer from 0 to 2 with the proviso that if a is 0 then b is 1 or 2 in at least one siloxane unit of the substituent and m is an integer of from 0 to 19 with the proviso that if m is 0 then a is 1, 2 or 3.

23. The crosslinked dispersion of claim 22, wherein the crosslinked dispersion includes 1 to 50 weight parts of liquid, branched methylsiloxane polymers comprising, $(CH_3)_3SiO_{0.5}$, $(CH_3)_2SiO$, and $CH_3SiO_{1.5}$, units and containing from 0.1 to 8% hydroxyl groups.

24. The crosslinked dispersion of claim 22, wherein the crosslinked dispersion includes 1 to 50 weight parts of branched methylsiloxane polymeric resins comprising, $(CH_3)_3SiO_{0.5}$, $(CH_3)_2SiO$, $CH_3SiO_{1.5}$, and $SiO_2$ units and containing from 0.1 to 8% hydroxyl groups.

25. The crosslinked dispersion of claim 22, wherein the crosslinked dispersion includes 1 to 10 weight parts of an organic solvent.

26. The crosslinked dispersion of claim 22, comprising up to 100 weight parts filler.

27. The crosslinked dispersion of claim 22, comprising up to 50 weight parts adhesion promoter.

28. The crosslinked dispersion of claim 22, comprising up to 50 weight parts of a shelf stabilizer.

29. The crosslinked dispersion of claim 22, comprising up to 50 weight parts of a silsesquioxane resin suspension.

30. The crosslinked dispersion of claim 22, comprising up to 10 weight parts of a catalyst deactivator.

31. The crosslinked dispersion of claim 22, which includes an amine stablizer selected from the group consisting of diethylamine, 2-amino-2-methyl-1-propanol, and tetramethylbutylguanidine.

32. The crosslinked dispersion of claim 22, wherein the surfactant is present in an amount comprising 2 to 5 weight parts.

33. The crosslinked dispersion of claim 22, wherein the water is present in an amount comprising 6 to less than 200 weight parts.

34. The crosslinked dispersion of claim 22, wherein the organic polymer is selected from the group consisting of polyether, polyester, ether-ester block co-polymer, polyurethane, polysulfide, polythioether, polythioester, polybutadiene, hydrogenated polybutadiene, styrene-butadiene co-polymer, acrylate-butadiene co-polymer, ethylene-butadiene co-polymer, vinylpyridinebutadiene co-polymer, ethylene-propylene co-polymer, ethylenevinyl acetate co-polymer, ethylene-acrylate co-polymer, polyisoprene, styrene-isoprene co-polymer, polyisobutylene, isobutylene-isoprene co-polymer, polychloroprene, styrene-chloroprene co-polymer, acrylonitrile-chloroprene co-polymer, polyacrylate, polymethacrylate, siloxane-ether block co-polymer, siloxane-olefin block co-polymer, fluoroolefin-ether co-polymer, and poly(perfluoroether).

35. The crosslinked silicon modified organic polymer dispersion of claim 22, wherein the silicon modified organic polymer bears at least one X group, wherein X is the same or different hydrolyzable or condensable group selected from the group consisting of alkoxy, aryloxy, alkoxyalkoxy, alkoxyaryloxy, alkenoxy, acyloxy, oximo, amino, aminoxy, amido, ureido, imidato, and isocyanato.

36. The crosslinked dispersion of claim 22, wherein the silicon modified organic polymer bears at least two hydroxysilyl or alkoxysilyl groups.

37. The crosslinked dispersion of claim 22, wherein the silicon modified organic polymer, bears at least two groups X where X is selected from the group consisting of aza-silacycloalkane, cyclosilalactam, cyclosila-urea, and other hydrolyzable or condensable groups.

* * * * *